(12) United States Patent
Sahr

(10) Patent No.: US 12,019,168 B2
(45) Date of Patent: Jun. 25, 2024

(54) SYSTEMS AND METHODS FOR LOCATION REPRESENTATION USING A DISCRETE GLOBAL GRID SYSTEM

(71) Applicant: Southern Oregon University, Ashland, OR (US)

(72) Inventor: Kevin Sahr, Applegate, OR (US)

(73) Assignee: Southern Oregon University, Ashland, OR (US)

( * ) Notice: Subject to any disclaimer, the term of this patent is extended or adjusted under 35 U.S.C. 154(b) by 0 days.

(21) Appl. No.: 18/053,709

(22) Filed: Nov. 8, 2022

(65) Prior Publication Data

US 2023/0184958 A1     Jun. 15, 2023

Related U.S. Application Data

(63) Continuation of application No. 16/294,773, filed on Mar. 6, 2019, now Pat. No. 11,536,853.

(Continued)

(51) Int. Cl.
*G01S 19/24*     (2010.01)
*G01C 21/20*     (2006.01)
(Continued)

(52) U.S. Cl.
CPC ............. *G01S 19/24* (2013.01); *G01C 21/20* (2013.01); *G06F 16/909* (2019.01); *G06T 17/20* (2013.01)

(58) Field of Classification Search
CPC ....... G01S 19/24; G01C 21/20; G06F 16/909; G06T 17/20

(Continued)

(56) References Cited

U.S. PATENT DOCUMENTS 3,696,566 A    10/1972   Langner
4,456,258 A    6/1984   Lodrick
(Continued)

FOREIGN PATENT DOCUMENTS

CA    2436312    2/2005
CA    2846734    9/2014
(Continued)

OTHER PUBLICATIONS

Affidavit of Joseph L. Ulvr, dated Oct. 6, 2006, Ontario Superior Court of Justice, Court File No. 06-CV-35606, 21 pages.

(Continued)

*Primary Examiner* — Harry K Liu
(74) *Attorney, Agent, or Firm* — Klarquist Sparkman, LLP

(57) ABSTRACT

Embeddings of spherical triangles onto a planar surface permit locations on a sphere to be represented as cells on the planar surface. Embeddings define paths based on one or more sets of great circles which can in turn be based on rotations of an icosahedron. Distances between locations as well as locations can be determined as integer values unlike conventional latitude/longitude-based systems that require floating point arithmetic. Some locations correspond to cells on different paths defined by one or more sets of great circles. Distance between two locations can be estimated as a minimum of distances associated with the cell locations on the different paths. Methods for processing data defined with respect to an origin point in three-dimensional space include establishing a set of concentric spherical shells with the origin point as their origin and establishing a discrete global grid on the concentric spherical shells.

22 Claims, 35 Drawing Sheets

Related U.S. Application Data

(60) Provisional application No. 62/639,285, filed on Mar. 6, 2018.

(51) Int. Cl.
  *G06F 16/90* (2019.01)
  *G06F 16/909* (2019.01)
  *G06T 17/20* (2006.01)

(58) Field of Classification Search
  USPC .................................................. 342/357.25
  See application file for complete search history.

(56) References Cited

U.S. PATENT DOCUMENTS

| | | |
|---|---|---|
| 4,691,291 A | 9/1987 | Wolfram |
| 4,809,202 A | 2/1989 | Wolfram |
| 5,631,970 A | 5/1997 | Hsu |
| 5,761,741 A | 6/1998 | Robbins et al. |
| 5,781,195 A | 7/1998 | Marvin |
| 5,848,404 A | 12/1998 | Hafner et al. |
| 6,182,069 B1 | 1/2001 | Niblack et al. |
| 6,282,489 B1 | 8/2001 | Bellesfield et al. |
| 6,292,134 B1 | 9/2001 | Bondyopadhyay |
| 6,384,826 B1 | 5/2002 | Bern et al. |
| 7,426,455 B1 | 9/2008 | Antony |
| 7,876,967 B2 | 1/2011 | Sahr |
| 8,229,237 B2 | 7/2012 | Sahr |
| 8,638,327 B2 | 1/2014 | Kallay et al. |
| 9,311,350 B2 | 4/2016 | Sahr |
| 10,132,645 B1 | 11/2018 | Yuen et al. |
| 2002/0069018 A1 | 6/2002 | Brueckner et al. |
| 2004/0225665 A1 | 11/2004 | Toyama et al. |
| 2005/0190179 A1 | 9/2005 | Hong et al. |
| 2005/0193365 A1 | 9/2005 | Sahr |
| 2006/0265197 A1 | 11/2006 | Peterson |
| 2010/0295849 A1 | 11/2010 | Chai et al. |
| 2011/0022296 A1 | 1/2011 | Sahr |
| 2012/0038662 A1 | 2/2012 | Dicklin et al. |
| 2012/0206494 A1 | 8/2012 | Sahr |
| 2012/0320040 A1 | 12/2012 | Algreatly |
| 2013/0073253 A1 | 3/2013 | Handa |
| 2014/0267261 A1 | 9/2014 | Samavati et al. |
| 2016/0137293 A1 | 5/2016 | Santangelo |
| 2016/0377451 A1 | 12/2016 | Pedrotti et al. |
| 2019/0277974 A1 | 9/2019 | Sahr |
| 2021/0278851 A1 | 9/2021 | Van der Merwe et al. |

FOREIGN PATENT DOCUMENTS

| | | | | |
|---|---|---|---|---|
| CA | 2846734 A1 * | 9/2014 | ............ | G06T 17/05 |
| CN | 1551020 A | 12/2004 | | |
| CN | 101128823 A | 2/2008 | | |
| CN | 101493514 A | 7/2009 | | |
| CN | 101685008 A | 3/2010 | | |
| CN | 101714027 | 5/2010 | | |
| CN | 102938018 A | 2/2013 | | |
| CN | 103700135 A * | 4/2014 | | |
| CN | 104350498 A | 2/2015 | | |
| CN | 106250610 A * | 12/2016 | ............ | B32B 15/06 |
| CN | 106503108 A | 3/2017 | | |
| CN | 107273466 A | 10/2017 | | |
| CN | 109752009 | 5/2019 | | |
| EP | 1475725 A2 | 11/2004 | | |
| EP | 2990840 | 3/2016 | | |
| EP | 3057812 | 8/2016 | | |
| EP | 3333725 | 6/2018 | | |
| JP | 2019121938 | 7/2019 | | |
| WO | WO 2005/013200 | 2/2005 | | |
| WO | WO 2005/071561 | 8/2005 | | |
| WO | WO-2016084964 A1 * | 6/2016 | ............ | A61B 5/055 |
| WO | WO 2018/035508 | 2/2018 | | |
| WO | WO 2018/136996 | 2/2018 | | |

OTHER PUBLICATIONS

Amended Statement of Defence of the Defendant Perry Peterson, dated Sep. 17, 2008, Ontario Superior Court of Justice, Court File No. 06-CV-35606, 8 pages.

Amendment Under 37 C.F.R. 1.114, filed with the U.S. Patent and Trademark Office on Mar. 25, 2010, in U.S. Appl. No. 10/552,901, 25 pp.

Carr et al., "ISEA Discrete Global Grids," *Statistical Computing & Statistical Graphics Newsletter*, 8:31-39 (1997).

Dutton, "Encoding and Handling Geospatial Data with Hierarchical Triangular Meshes," Department of Geography, University of Zurich, *Advances in GIs Research II, London: Taylor & Francis*, pp. 505-518, (1996).

Exhibit K to Joseph L. Ulvr Affidavit, Oct. 6, 2006.

Exhibit L to Joseph L. Ulvr Affidavit, Oct. 6, 2006.

Extended European Search Report from European Application No. 19764723.3, dated Nov. 3, 2021, 12 pages.

Fearnley, "Exploring Foldable Great Circle Geometries," Presentation to ISAMA 2009 (Eighth Interdisciplinary Conference of the International Society of the Arts, Mathematics, and Architecture), 61 pages (Jun. 23, 2009).

Gargantini, "An Effective Way to Represent Quadtrees," *CACM*, vol. 25, No. 12, Dec. 1982, pp. 905-910.

Gilmore et al., "Hipparchus Tutorial and Programmer's Guide, Chapter 6: Working with Voronoi Cells," Feb. 27, 2004, 17 pp.

Hou et al., "Hierarchical Path Planning with Hexagonal Decomposition," IEEE Int'l Conf. on Systems, Man and Cybernetics, 13-16, Oct. 1991, vol. 2, pp. 1005-1010.

International Preliminary Report on Patentability from International Application No. PCT/US2019/021032, dated Sep. 8, 2020, 8 pages.

International Search Report, dated Dec. 17, 2004, in PCT/CA2004/001507, 2 pp.

International Search Report and Written Opinion of the International Searching Authority, dated Dec. 23, 2010, for corresponding International Application No. PCT/US2010/054550.

International Search Report and Written Opinion from International Application No. PCT/US2019/021032, dated Jun. 25, 2019, 11 pages.

Jiang, "Orthogonal and Biorthogonal FIR Hexagonal Filter Banks with Sixfold Symmetry," *IEEE Trans. Signal Proc.*, 56(12):5861-5873 (Dec. 2008).

Kobbelt, "√3-Subdivision," *Computer Sciences*, http:/www-i8.informatik.rwth-aachen.de/publications/downloads/sqrt.3, SIGGRAPH 2000: pp. 103-112 (2001).

Majewski et al., "The Operational Global Icosahedral-Hexagonal Gridpoint Model GME: Description and High-Resolution Tests," *AMS Journals Online*, vol. 130, Issue 2, pp. 319-338.

Middleton et al., "Framework for Practical Hexagonal-Image Processing," *J. Electronic Imaging*, Vo. 11(1), Jan. 2002, pp. 104-114.

Notice of Allowance, dated Mar. 22, 2012, issued by the U.S. Patent and Trademark Office, in U.S. Appl. No. 12/897,612, 11 pp.

Office Action, dated Apr. 9, 2009, issued by the Canadian Intellectual Property Office, in Canadian Patent Application No. 2,436,312, 4 pp.

Office Action, dated Oct. 30, 2008, issued by the U.S. Patent and Trademark Office, in U.S. Appl. No. 10/552,901, 23 pp.

Office Action, dated Oct. 12, 2011, issued by the U.S. Patent and Trademark Office, in U.S. Appl. No. 12/897,612, 11 pp.

Office Action issued in Chinese Patent Application No. 201980029329.1, dated Jan. 6, 2022, 11 pp. (with English Translation, 13 pp.).

Plaintiff's Amended Statement of Claim, dated Aug. 15, 2006, Ontario Superior Court of Justice, Court File No. 06-CV-35606.

Russell, "Spatial Data and the Voronoi Tessellation," *Dr. Dobb's Journal*, Dec. 1, 1992, 30 pp.

Sahr et al., "Geodesic Discrete Global Grid Systems," *Cartography and Geographic Information Science*, 30:121-134 (2003).

Sahr et al., "Discrete Global Grid Systems," *Computing Science and Statistics*, vol. 30 (1998), 10 pp.

Song et al., "Developing an Equal Area Global Grid by Small Circle Subdivision," *Discrete Global Grids*, May 8, 2002, 29 pp.

(56) References Cited

OTHER PUBLICATIONS

Supplemental Notice of Allowability, dated Apr. 25, 2012, issued by the U.S. Patent and Trademark Office, in U.S. Appl. No. 12/897,612, 4 pp.
Weisstein, "Koch Snowflake," *Mathworld—A Wolfram Web Resource*, downloaded Aug. 6, 2009, 2 pp.
D. White, "Global Grids from Recursive Diamond Subdivisions of the Surface of An Octahedron or Icosahedron," *Envir. Monitor. and Assess.*, 64(1), 2000, pp. 93-103.
Written Opinion of the International Searching Authority, dated Dec. 17, 2004, in PCT/CA2004/001507, 4 pp.
Written Opinion of the International Searching Authority, dated May 17, 2005, in PCT/CA2005/000056, 7 pp.
Office Action issued in Chinese Patent Application No. 201980029329.1, dated Oct. 8, 2022, 14 pp. (with English Translation, 14 pp.).

\* cited by examiner

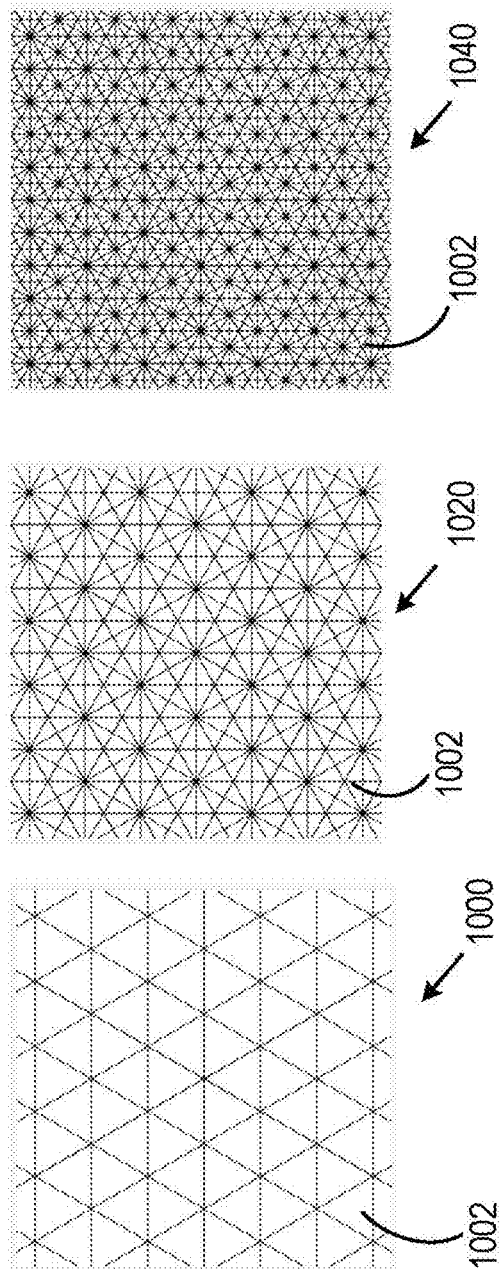

SYSTEMS AND METHODS FOR LOCATION REPRESENTATION USING A DISCRETE GLOBAL GRID SYSTEM

CROSS REFERENCE TO RELATED APPLICATION

This application is a continuation of U.S. patent application Ser. No. 16/294,773, filed Mar. 6, 2019, which claims the benefit of U.S. Provisional Application No. 62/639,285, filed Mar. 6, 2018, all of which are hereby incorporated by reference in their entireties.

FIELD

The disclosure pertains to storage and processing of location-based data.

BACKGROUND

Vehicle locations are typically established using latitude and longitude that can be calculated by, for example, timing differences among a plurality of navigation signals received from Global Positioning System (GPS) satellites. Routes and distances between locations are then determined using the calculated latitudes and longitudes.

While latitude/longitude based positioning systems can provide suitable distance and location estimates, such systems tend to be unduly complex, and the associated location/distance computations require floating point (real number) arithmetic. These latitude and longitude computations are more processor-intensive than computations involving integer values to which processors are well-suited. In addition, establishing and updating databases that include location dependent information is complicated by the presence of real numbers, and arrangements of geophysical and other location-dependent data can require additional processor power simply to provide floating point number processing. Improved systems and methods are needed.

SUMMARY

Computer-implemented methods for processing data defined with respect to a spherical surface comprise assigning a target cell on the spherical surface to an associated spherical data value and establishing a grid that covers at least a portion of the spherical surface based on selected great circle paths and a cell orientation. At least a portion of the grid is embedded on a planar surface and a cell in the embedded grid corresponding to the assigned target cell on the spherical surface is determined. In some examples, the assigned target cell is a first target cell and the method further includes determining a cell in the embedded grid corresponding a second target cell on the spherical surface and estimating a distance from the first target cell to a second target cell in the embedded grid. In other examples, a plurality of distances from the first target cell to the second target cell in the embedded grid is estimated and a shortest distance among the plurality of distances is selected. In some cases, the associated path in the embedding is displayed. In other alternatives, an array of cells that includes cells at a single grid resolution, or a hierarchical array of cells is established. In still further examples, a processor is coupled to establish the hierarchical grid based on an embedding of one or more spherical triangles onto a plane, and the array of cells is based on at least one set of great circle paths. In some cases, the great circle paths are associated with Class I, Class II, or Class III great circles, or combinations thereof. In a particular example, the array of cells is a hierarchical array of cells that includes cells associated with a first resolution and a second resolution. In further embodiments, the target cell is situated in a selected least common denominator triangle. In other representative examples, the target cell is assigned integer coordinates, and a distance to a second cell is determined as an integer value based on the integer coordinates.

Navigation systems comprise a position receiver situated to detect a plurality of location signal and a processor coupled to the position receiver to establish a location based on the detected location signal, assign the established location to a cell in an array of cells, wherein the arrays of cells includes cells situated on a path defined by an embedding of at least a portion of an icosahedral surface corresponding to an associated portion of a spherical surface, and estimate a distance from the established location to a destination location based on the cell associated with the established location and a destination cell associated with the destination. In some examples, the array of cells defines either cells at a single grid resolution, or a hierarchical grid of cells and the distance is determined based on coordinates associated with the cells associated with the location and the destination. In typical examples, the position receiver is a GPS receiver and the processor is coupled to establish the hierarchical grid based on an embedding of one or more spherical triangles onto a plane. In further examples, the destination location is associated with a plurality of paths, and the estimated distance is a minimum distance of the distances defined by the plurality of paths. In some examples, the array of cells is based on at least one set of great circles, and the great circles are Class I great circles, Class I and Class II great circles, Class I and Class III great circles, or combinations thereof. In a practical example. the location is established as a longitude and a latitude and the array of cells is a hierarchical array of cells that includes cells associated with a first resolution and a second resolution. In typical examples, the cell associated with the established location is situated in a selected least common denominator triangle.

Methods comprise, in a navigation system that includes a processor, receiving a first location and identifying at least one cell in a cellular grid associated with the first location, wherein the cell is on a path defined by embedding at least a portion of a spherical surface onto a plane based on a selected set of great circle paths on the spherical surface and a selected ordering of cells with respect to the selected set of great circle paths. At least one cell in the cellular grid associated with a second location is identified and a distance between the first location and the second location is determined based on the associated identified cells. In some examples, the cells are hexagonal. In still further examples, a plurality of cells are identified as corresponding to the second location, and the distance between the first location and the second location is determined as a minimum of the distances between the cell associated with the first location and each of the cells associated with the second location. In other embodiments, the cells associated with the first location and the second location are assigned integer coordinates, and the distance is determined as an integer value based on the integer coordinates. In some examples, the cellular grid is defined based on a selection of one or more of Type I, Type II, and/or Type III Great Circles on the spherical surface, and the cells are oriented as Class I, Class II, Class I/III, or Class II/III cells. In a particular example, the cells have a Class II orientation, and the cellular grid is defined based on both Type I and Type II Great Circle paths.

Database systems comprise a processor configured to store location based data based on an embedding of a spherical grid into a planar grid. Each data element is assigned to a cell based on a selection of one or more great circle paths on the spherical surface and an orientation of cells with respect to the one or more great circles. In typical examples, a location associated with each data item is stored as one or more integer values and the selection of great circle paths includes selection of one or more Type I, Type II, and/or Type III great circle path and the cells are oriented as Class I, Class II, Class I/III, or Class II/III cells.

Methods of three-dimensional indexing comprise defining a plurality of concentric shells and establishing at least one cell on each of the shells. A location is established by identifying corresponding cells on each of the plurality of shells. In some cases, an index to the at least one location based on the corresponding cells on each of the shells. In other examples, the shells are concentric spherical shells, and the cells on each of the shells are hexagonal. In a typical example, the cells on each shell have a common area, and cells on different shells have different areas. In further examples, the location is stored in a memory or other computer-based storage device based on the assigned index.

Computer-implemented methods for processing data defined with respect to an origin point in three-dimensional space comprise, with a processor, establishing a set of concentric spherical shells with the origin point as their origin. A discrete global grid is established on each of the concentric spherical shells. A discrete global grid indexing system is defined based on a sequence of discrete global grids on the progressively larger or smaller spherical shells. A target location in the three-dimensional space is assigned to a corresponding index on a spherical shell. In some examples, the discrete global grid system is an icosahedral hexagonal system and the discrete global grid system indexing is hierarchical integer indexing. Database systems comprise a processor configured to store location based data processing in this way. In typical examples, a location associated with each data item is stored as one or more integer values.

The foregoing and other objects, features, and advantages of the disclosed technology will become more apparent from the following detailed description, which proceeds with reference to the accompanying figures.

BRIEF DESCRIPTION OF THE DRAWINGS

FIGS. 2A-2D illustrates different orientations of hexagons with respect to triangle edges, referred to as Class I, Class II, Class I/III, and Class II/III, respectively. Such divisions can use smaller or larger hexagons dependent on an intended spatial resolution.

FIGS. 7C-1 to 7C-4 illustrate complete great circle path embeddings of combined Type III great circle paths defined by an LCD triangle 0 or LCD triangle 1.

FIGS. 10A-10C illustrate three planar triangle grids.

FIG. 10C illustrates a superposition of the two coarser triangle grids of FIGS. 10A and 10B.

FIGS. 11A-11B show cell/raster grids, FIG. 11C shows a vector/point grid.

FIG. 12A illustrates an embedding of LCD sub-triangles, FIG. 12B illustrates a DGGS resolution 1 raster grid, FIG. 12C illustrates a DGGS resolution 2 raster, and FIG. 12D illustrates a DGGS resolution 3 vector grid.

DETAILED DESCRIPTION

Figure 1:
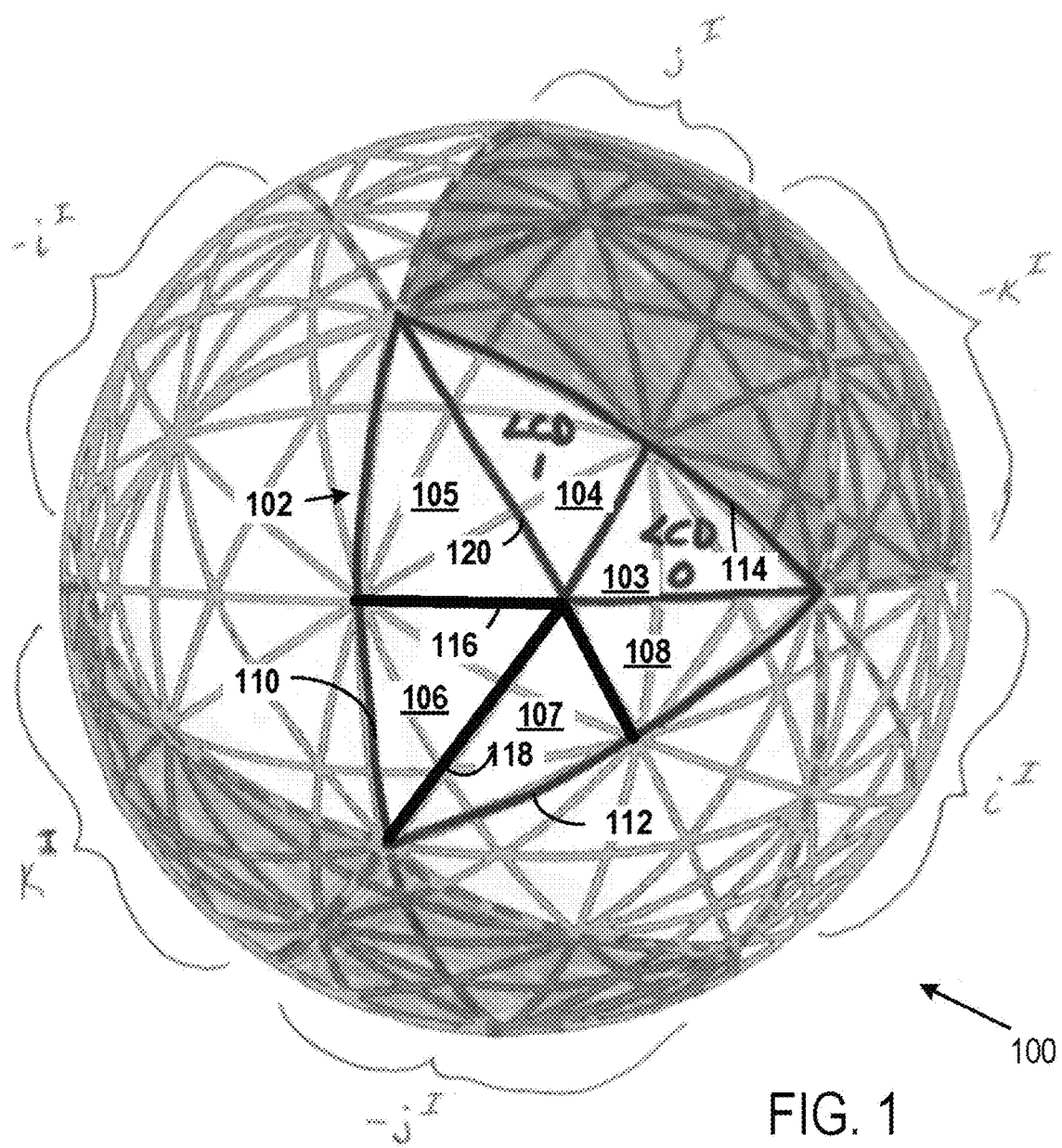
FIG. 1 illustrates a representative Type I great circle (GC) division of a sphere into a plurality of spherical triangles with further division into lowest common denominator (LCD) triangles for embedding onto a planar surface.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

The disclosure pertains generally to computer-based manipulation of data associated with locations on a spherical surface using planar embeddings defined by selected great circle paths and arrangements of grids. Typically data is associated with one or more grids on a spherical surface that is mapped to an icosahedron, and the grids are then included in a planar embedding as specific by the selected great circle paths and grid arrangement. In many practical examples, data is geographical data and the disclosed approaches address problems in processor-based access, storage, and manipulation of such data.

In the following, systems and methods that provide determinations of distances between locations are provided, generally based on mappings (referred to herein as embeddings) of an icosahedron or other polyhedron used to represent a spherical surface onto a plane. In embedding, each polygon used to represent the spherical surface remains connected to adjacent polygons as embedded. Although such embeddings can, in some cases, be associated with multiple distances between two locations, in most cases, the minimum distance (corresponding to a best estimate) can be obtained without evaluating multiple possibilities. However, evaluation of multiple possibilities is generally simple and straightforward, if necessary. Example embeddings of a regular icosahedron are discussed below for convenient illustration, but other polyhedral shapes can be used. Embeddings are generally provided with one or more sets of cells such as hexagonal cells, and in some cases, a hierarchy of cells of different resolutions. In some examples, latitude and longitude are used for location inputs and outputs, requiring transformation to a grid/embedding representation, but other calculations can be done using integer computations. With embeddings/grids, assignment of data to various locations as well as determinations of distances and paths between locations can be more efficiently implemented using dedicated or less complex processors as only integer calculations are required. This can simplify design, and increase battery life in mobile navigation systems.

The term "type" is generally used herein to refer to great circles (GCs) on the sphere or paths on an embedding. The term "class" is generally used to refer to hexagon orientations with respect to lowest common denominator triangle edges. There are three types of GCs defined by spinning an icosahedron about the axes between opposite vertices (type I), by spinning about axes between opposing midpoints of edges (type II), and by spinning centers of opposing faces (type III). An embedding of a sphere on an icosahedron is associated with 20 spherical triangles, each of which can be divided into six lowest common denominator (LCD) triangles, so that a spherical surface is associated with 120 triangles as embedded. LCD triangles, GCs, and paths of various types are illustrated in detail in the examples discussed below. The LCD triangles can be used to define a mapping onto a plane, and hexagons can be situated with respect to the embedded LCD triangles.

Grid systems are described in Sahr, U.S. Pat. No. 8,229,237, which is incorporated herein by reference.

In typical examples, an embedding is provided with cells that correspond to pixels, areal units, or fields. Representative applications include satellite imagery, average temperatures or other weather or climate-related quantities, land cover classifications, soil classifications, microclimates, terroirs, or other geographical or geological, plant/animal populations, demographics, or other quantities which are associated with areas or can be mapped so as to be associated with areas.

Neighborhood and metric distance determinations can be based on an embedding, and can be used in image processing and analysis, pattern recognition, path planning, and other applications. Cells can also represent point (or "vector") locations. Other representative examples include navigation systems, ride-hailing systems, and autonomous vehicles. In such applications, neighborhood and metric distance can be used as efficient approximations to Euclidean distance. In still other examples, cells serve as buckets for data storage or "shards" for assigning data to computing nodes. Example uses would be use in storage/access of data from applications such as described above, or for data using existing location representations such as latitude and longitude.

The disclosed methods and apparatus have various applications. Locations on a spherical surface can be displayed on a planar surface such as a computer monitor and assigned coordinates on the planar surface that are associated with orthogonal or non-orthogonal axes. In addition to location coordinates, such displays can show one or more paths connecting two or more locations as well as distances along the paths. Spherical areas can also be embedded and displayed in a plane along with associated data. The disclosed approaches can provide enhanced accuracy with less processing complexity than conventional approaches.

Example Embedding

With reference to FIG. 1, a spherical surface 100 is divided into a plurality of spherical triangles such as representative spherical triangle 102 that includes representative lowest common denominator LCD triangles 103-107. The spherical triangle 102 is bounded by great circles 110, 112, 114; the LCD triangles are defined by additional great circles 116, 118, 120. Shaded regions corresponding to i, j, and k coordinate directions for Type I GC paths are shown.

Figure 2A:
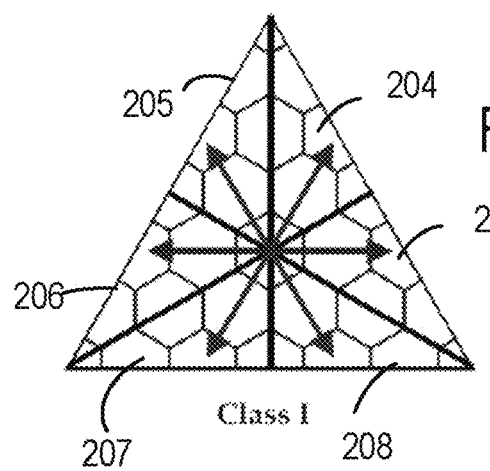
FIGS. 2A-2D illustrate a representative division of spherical triangles such as those of FIG. 1 into hexagons.
Figure 2B:
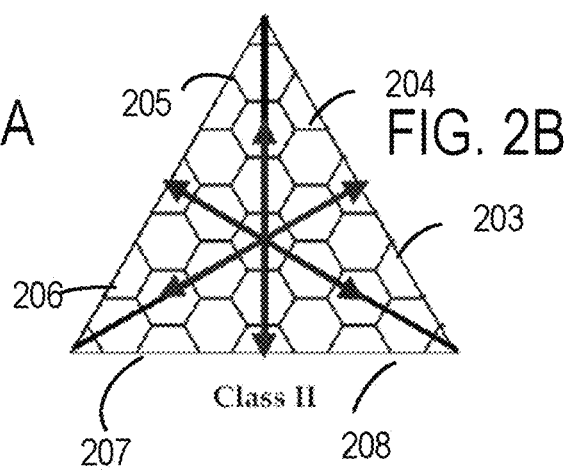
Figure 2C:
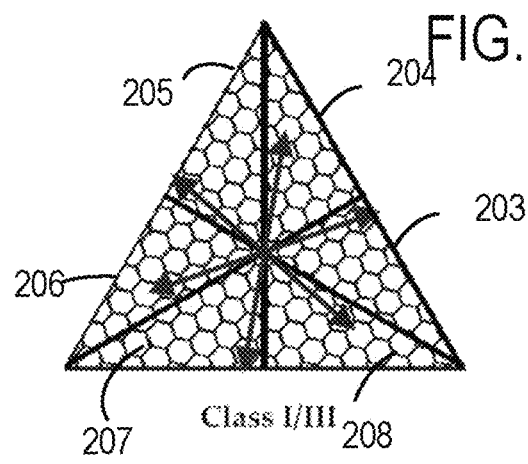
Figure 2D:
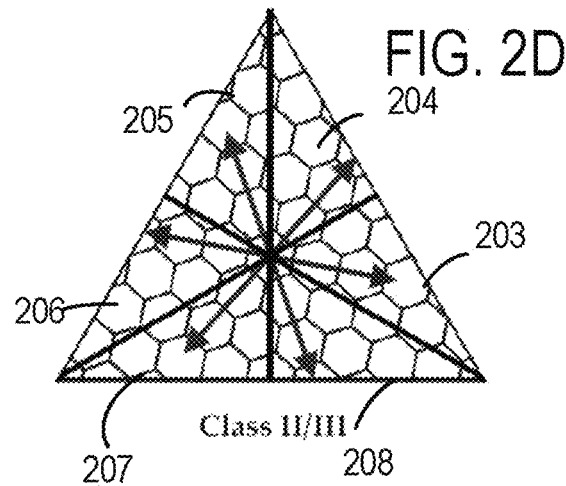

Spherical triangles such as the spherical triangle 102 can be selected to correspond to faces of an icosahedron that approximates the spherical surface 100. As used herein, icosahedron refers to a regular convex icosahedron that is defined by twenty identical triangles. Each or selected spherical triangles can be further divided into hexagons as shown in FIGS. 2A-2D. For convenience, additional divisions into series of smaller hexagons are not shown, but each of FIGS. 2A-2D illustrates a different orientation of hexagons relative to LCD triangle edges; these arrangements are referred to as Class I, Class II, Class I/III and Class II/III, respectively. As shown in FIGS. 2A-2D, LCD triangles can be mapped to triangles 203-208 which are then provided with arrays of hexagons. FIG. 2A illustrates a Class I arrangement of hexagons, FIG. 2B illustrates a Class II arrangement of hexagons, FIG. 2C illustrates a Class I/III arrangement of hexagons, and FIG. 2D illustrates a Class II/III arrangement of hexagons. Hexagons of different areas than those illustrated can be used, and hexagon grids can be subdivided into finer (i.e., smaller area) hexagons as necessary.

Figure 3:
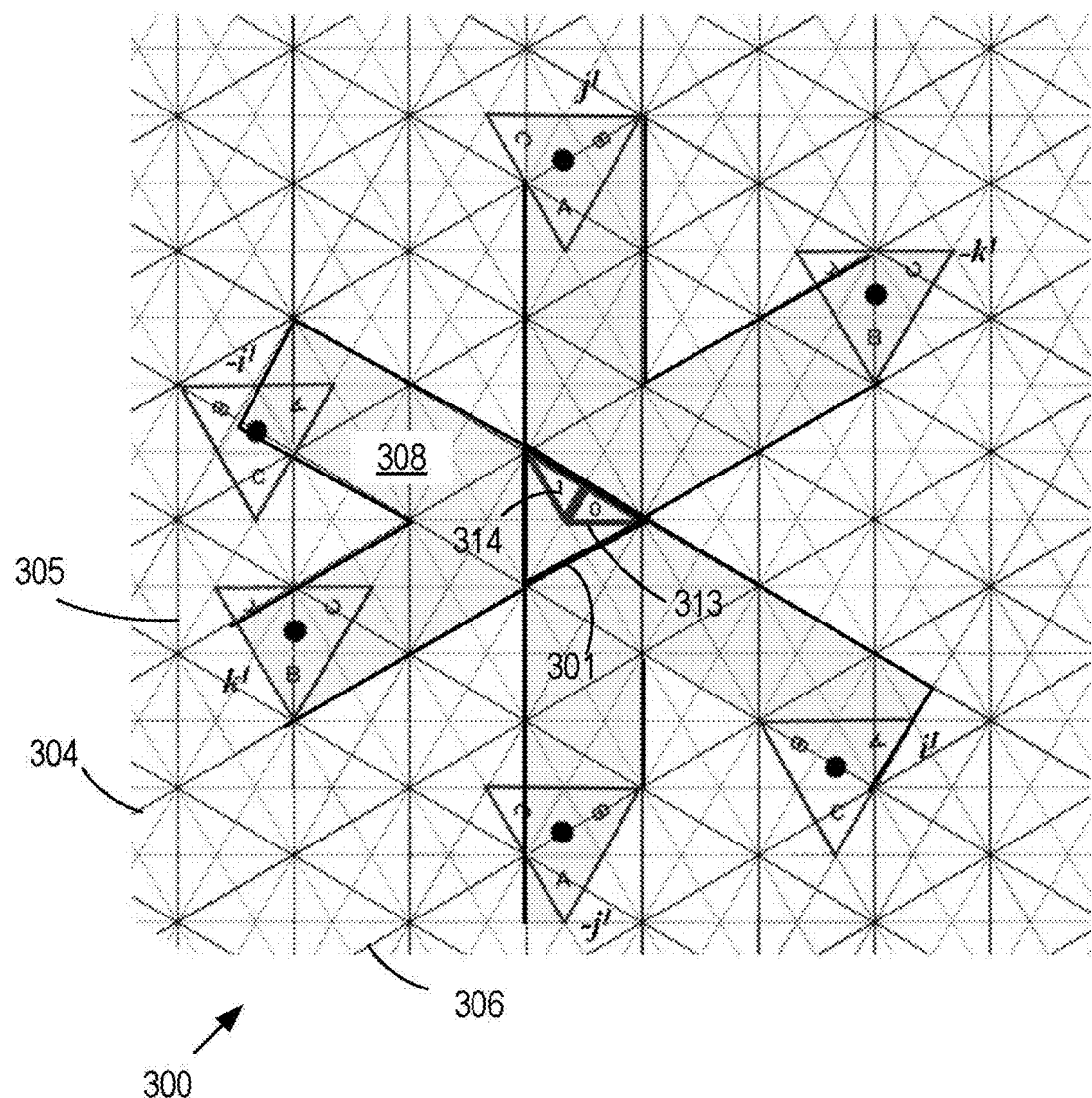
FIG. 3 illustrates an embedding of spherical triangles corresponding to the faces of an icosahedron onto a planar grid that defines Type I paths.

FIG. 3 illustrates an embedding of spherical triangles defined by an icosahedron onto a planar grid 300 using class I GCs. Darker lines in FIG. 3 such as lines 304-306 (corresponding to class II GCs) define planar triangles corresponding to the spherical triangles, and the shaded area 308 is associated with the embedding. The representative line 304 and related parallel lines define a k-axis associated with $+k^I$ and $-k^I$ coordinates, wherein the superscript indicates that the path boundaries align with hexagonal grids with a class I orientation. Unshaded areas are associated with portions of the planar grid 300 that do not correspond to areas of the spherical surface. Additional embeddings can be used as well based on complete rotations of the sphere, but these are not shown. In the example of FIG. 3, spherical LCD triangles 103, 104 of FIG. 1 are shown as mapped to planar triangles 313, 314, respectively. The spherical triangle 102 of FIG. 1 is mapped to a planar triangle 301. Other embeddings of a spherical surface can be based on the Class II or Class III GCs (or combinations thereof); in some cases, combinations of classes are needed for a complete embedding of the icosahedral grid onto the plane; these are referred to as combined Type III paths.

Figure 4A:
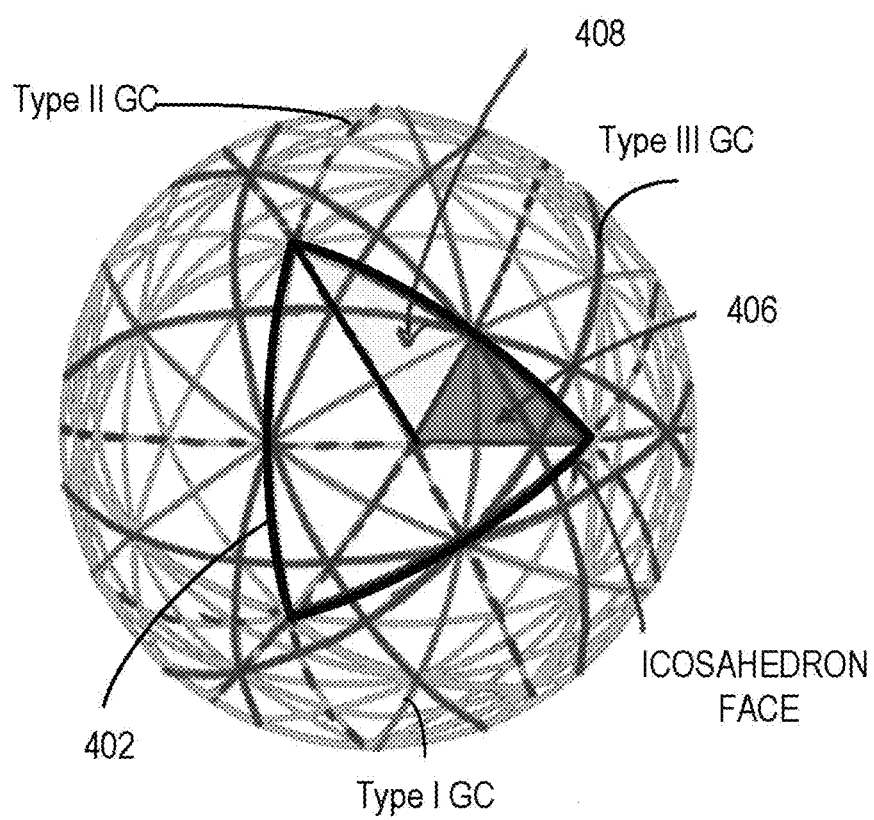
FIG. 4A illustrates Type I, II, and III Great Circles (GCs) with respect to a selected spherical triangle and the associated spherical triangles that correspond to faces of an icosahedron.
Figure 4B:
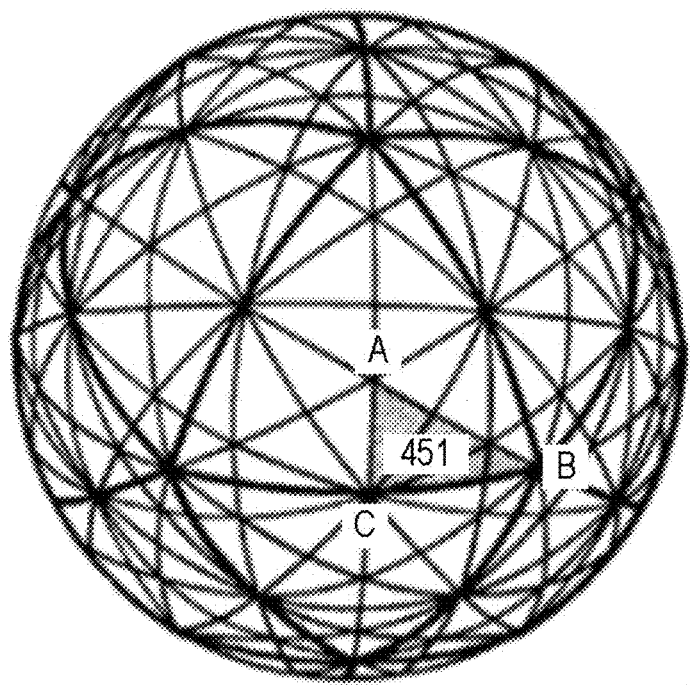
FIGS. 4B-4C illustrate GCs with respect to a selected LCD triangle.
Figure 4C:
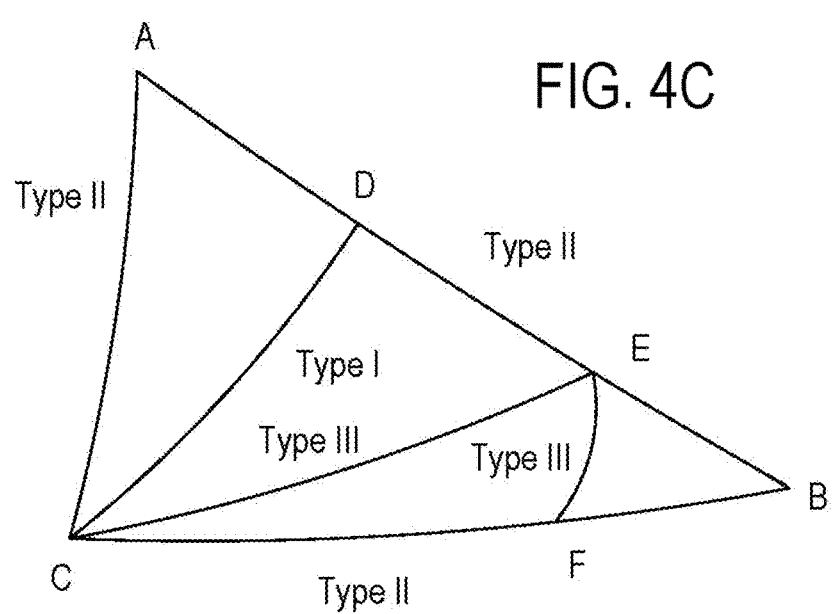

FIG. 4A illustrates a spherical surface with a representative spherical triangle 402, Type I, Type II, and Type III great circles, and LCD triangles 406, 408. FIG. 4B illustrates a representative LCD triangle 451 and FIG. 4C illustrates great circles passing through the LCD triangle 451 by GC type. As shown in FIG. 4C, arcs AB, AC, BC correspond to Type II GCs; arcs CE and EF correspond to Type III GCs, and arc CD corresponds to a Type I GC. Vertices A, B, and C of the LCD triangle are noted in both FIG. 4B and FIG. 4C to show orientations.

Figure 5A:
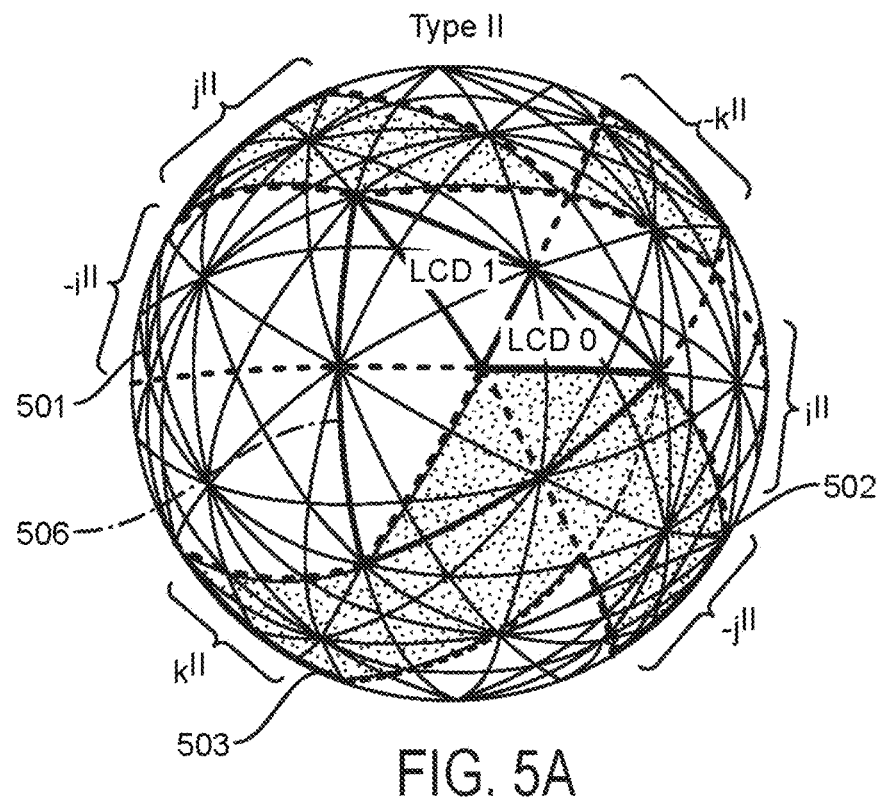
FIG. 5A illustrates Class II great circle paths defined by an LCD triangle 0.
Figure 5B:
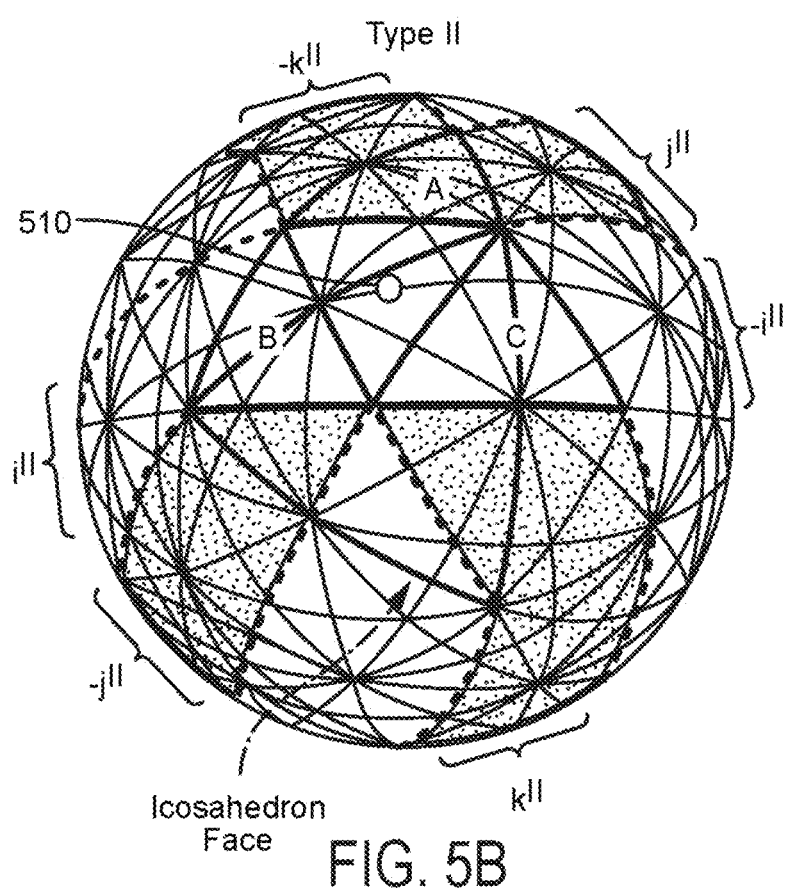
FIG. 5B illustrates the Class II great circle paths defined by the LCD triangle 0, as viewed from the opposite side of the sphere of FIG. 5A.

FIG. 5A illustrates Type II great circle paths defined by LCD triangle 0 in a spherical triangle 506 which corresponds to a face of an icosahedron. Regions 501-503 correspond to available Type II GC paths that can be described with coordinate axes $i^{II}$, $j^{II}$, and $k^{II}$, respectively as shown. FIG. 5B illustrates the Type II GC paths defined by LCD triangle 0 of FIG. 5A, as viewed from the opposite side of the sphere of FIG. 5A. Spherical triangles A, B, and C are regions in which two Type II paths overlap. All three paths overlap at 510.

Figure 6A:
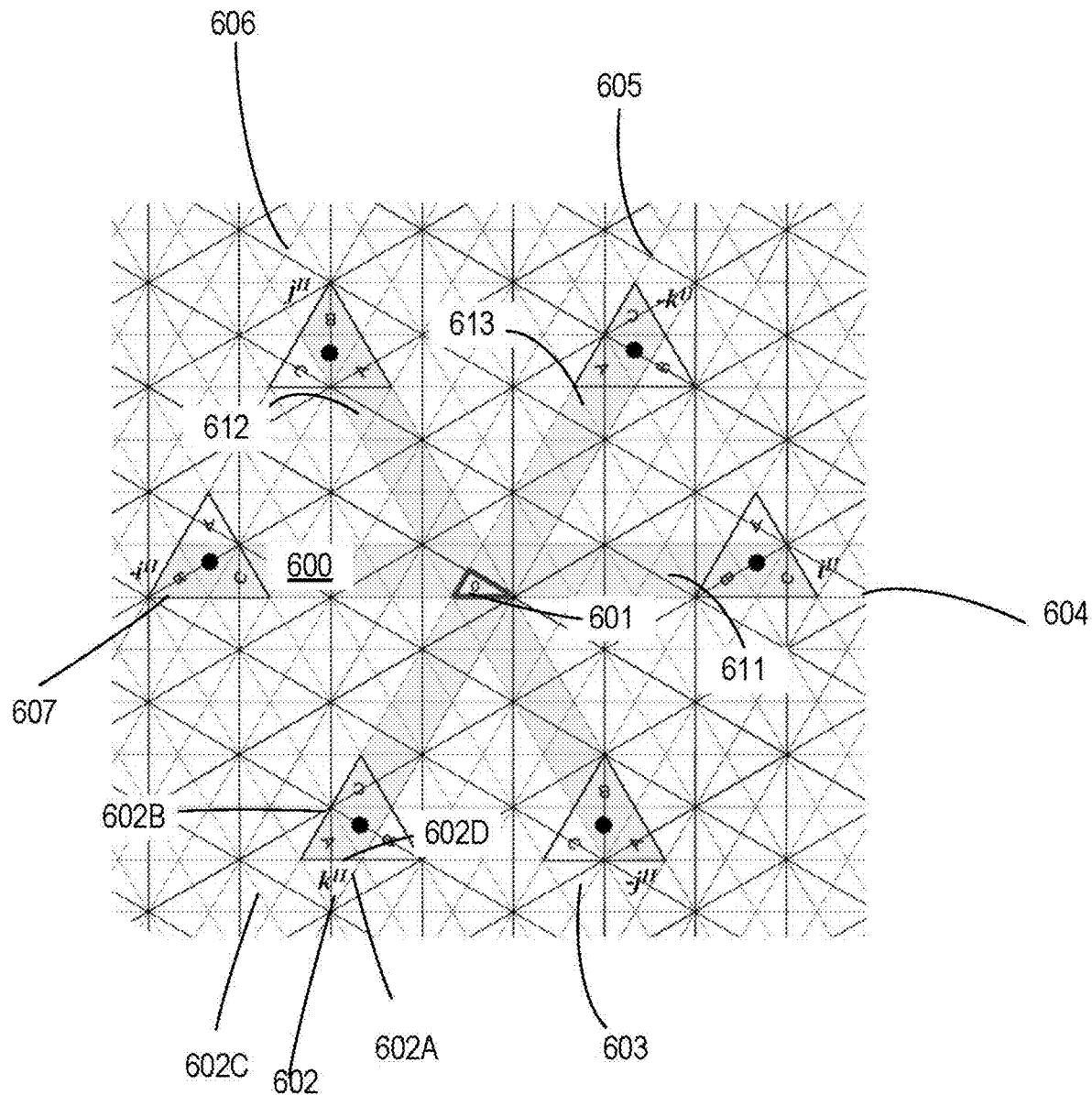
FIG. 6A illustrates a complete great circle path embedding of Class II great circle paths defined by LCD triangle 0 such as shown in FIGS. 5A-5B.
Figure 6B:
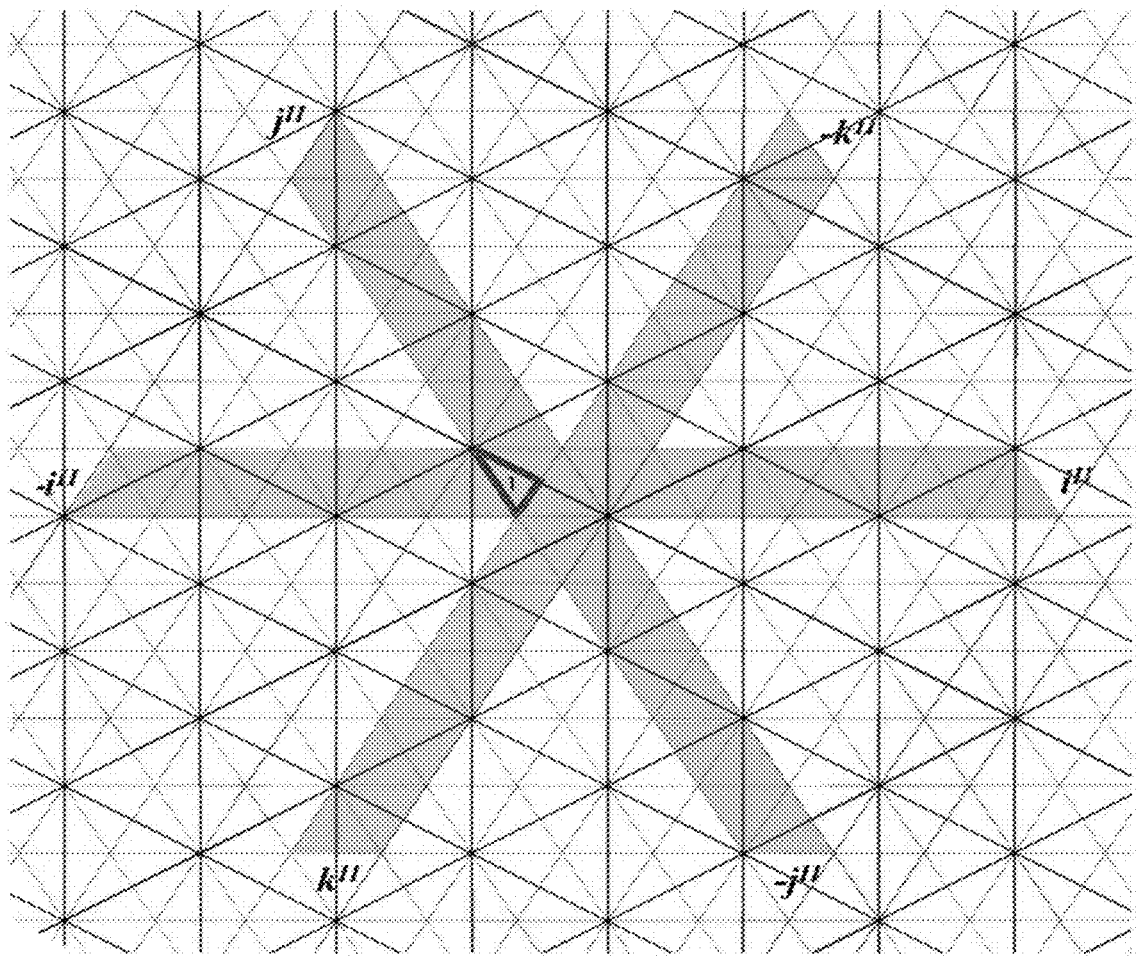
FIG. 6B illustrates a complete great circle path embedding of Class II great circle paths defined by LCD triangle 1.

FIG. 6A illustrates a complete great circle path embedding 600 of Type II great circle paths defined by LCD triangle 0 (601) shown in FIGS. 5A-5B. The embedding 600 includes path regions 611-613 that can be associated with coordinate axes $i^{II}$, $j^{II}$, and $k^{II}$, respectively. Triangular regions 602-607 are regions that overlap on an opposite side of a spherical surface with LCD triangle 0 on a front side. Note that some portions of these triangles are not part of the path regions 611-613. For example, triangle 602 includes triangular subportions 602B-602D which are part of the path region 613 and a triangular subportion 602A which is not part of path region 613. Relative orientations of the triangular regions 602-607 are illustrated with letters A, B, and C denoting corresponding triangular subportions. Generally, some LCD triangles on a spherical surface do not occur on any Type II path defined by LCD triangle 0, or only on some Type II paths. FIG. 6B illustrates a complete great circle path embedding of Type II great circle paths defined by LCD triangle 1.

Figure 7A:
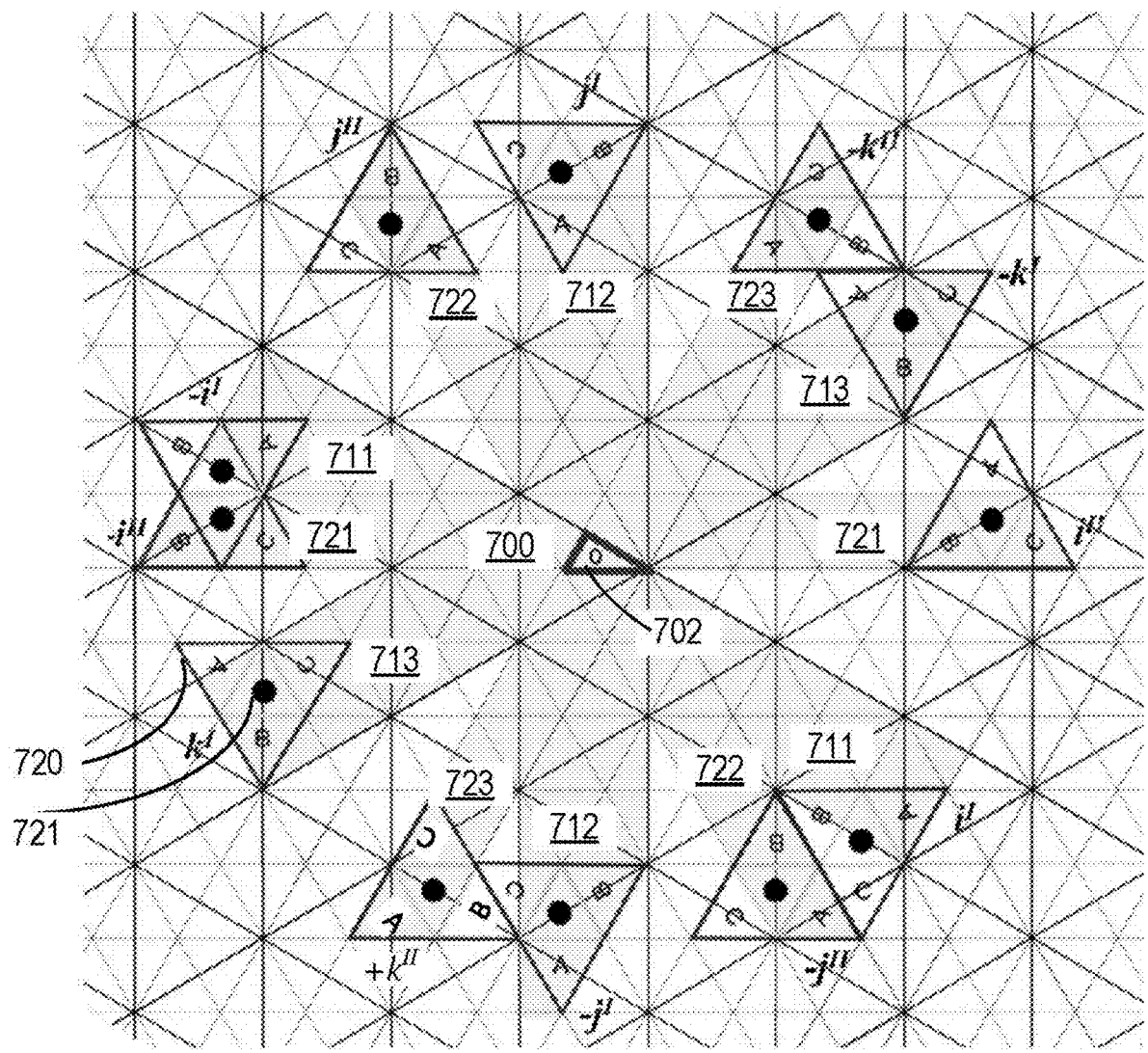
FIG. 7A illustrates complete great circle path embeddings of Class I and II great circle paths defined by an LCD triangle 0.
Figure 7B:
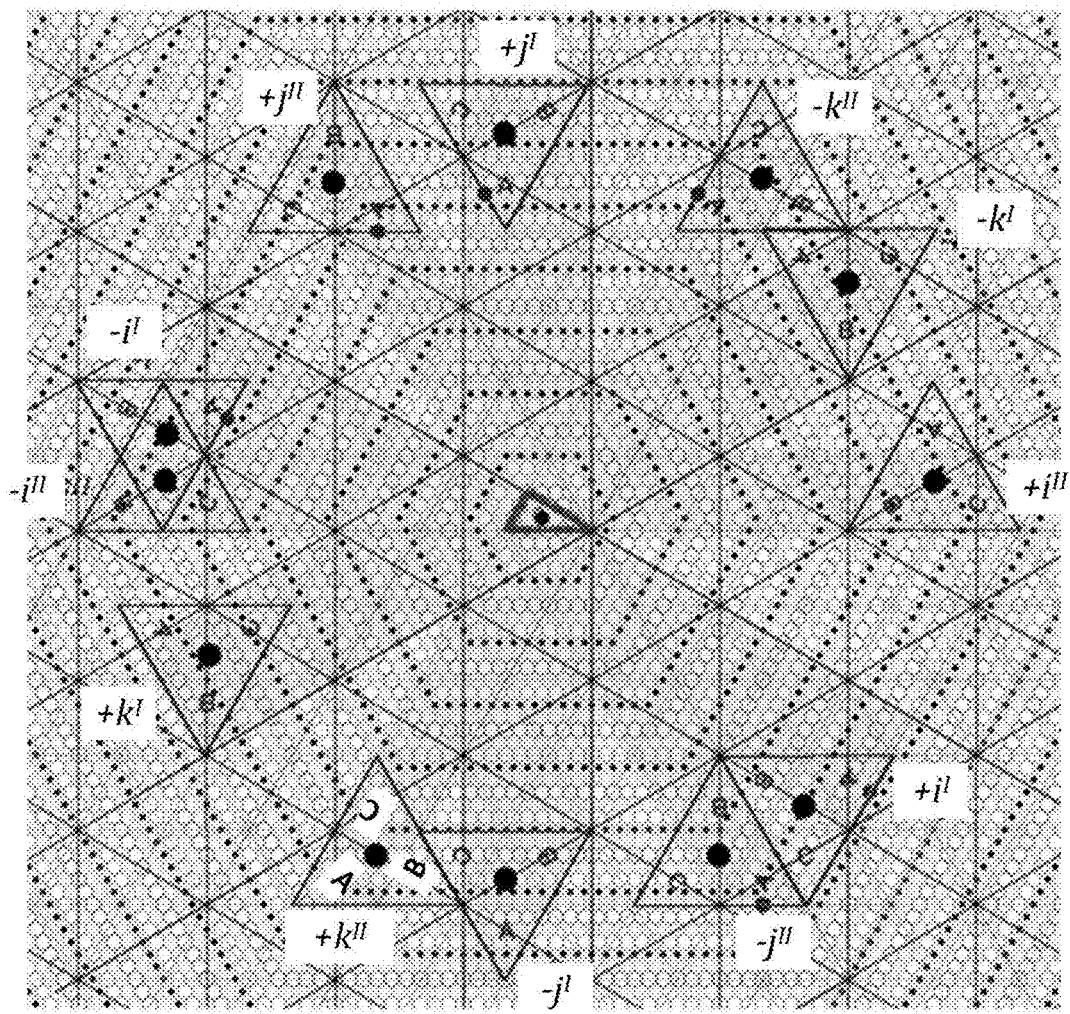
FIG. 7B illustrates the complete great circle path embeddings of Class I and II great circle paths of FIG. 7A with a superimposed hexagonal grid.
Figures 1, 7C:
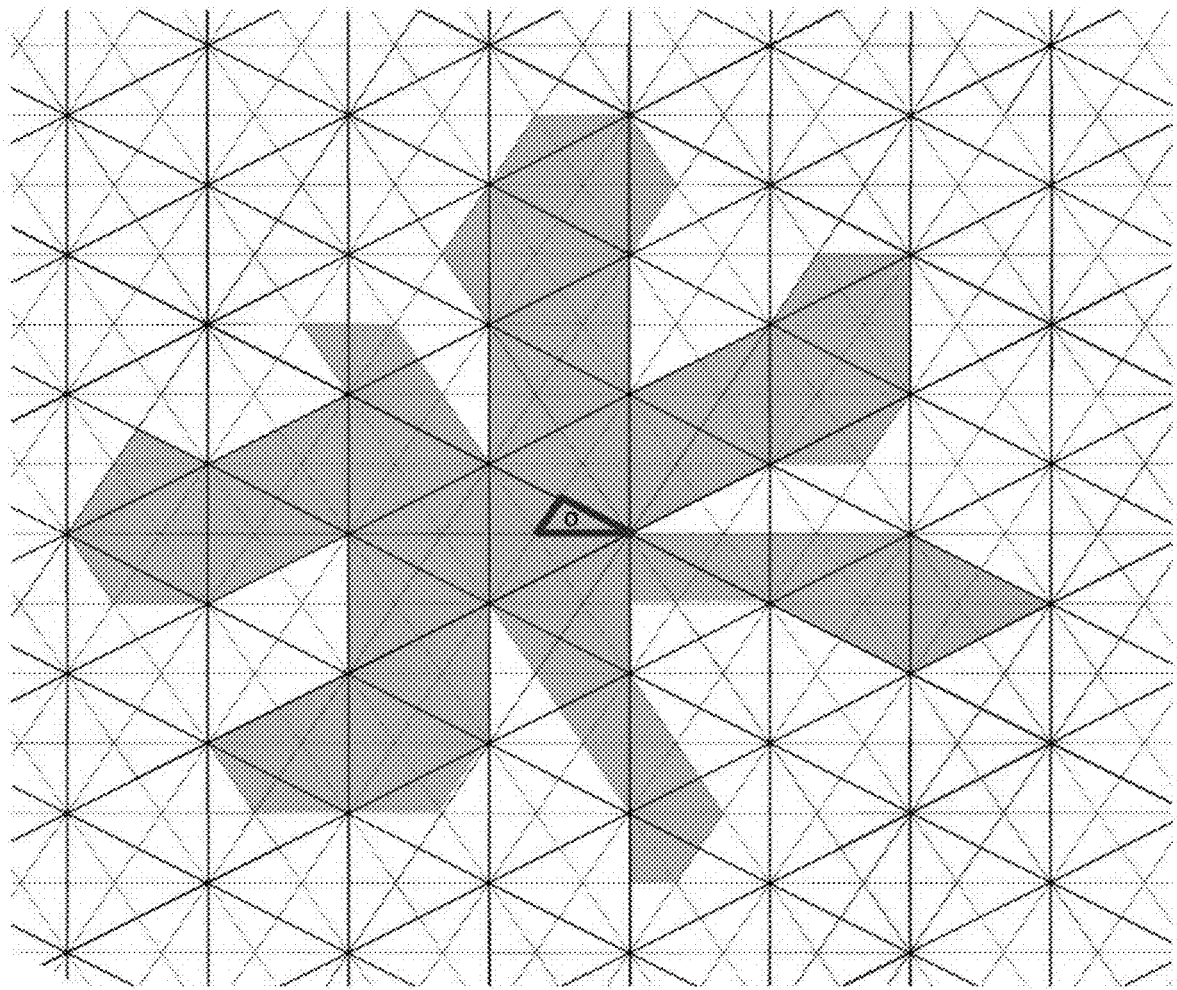
Figures 2, 7C:
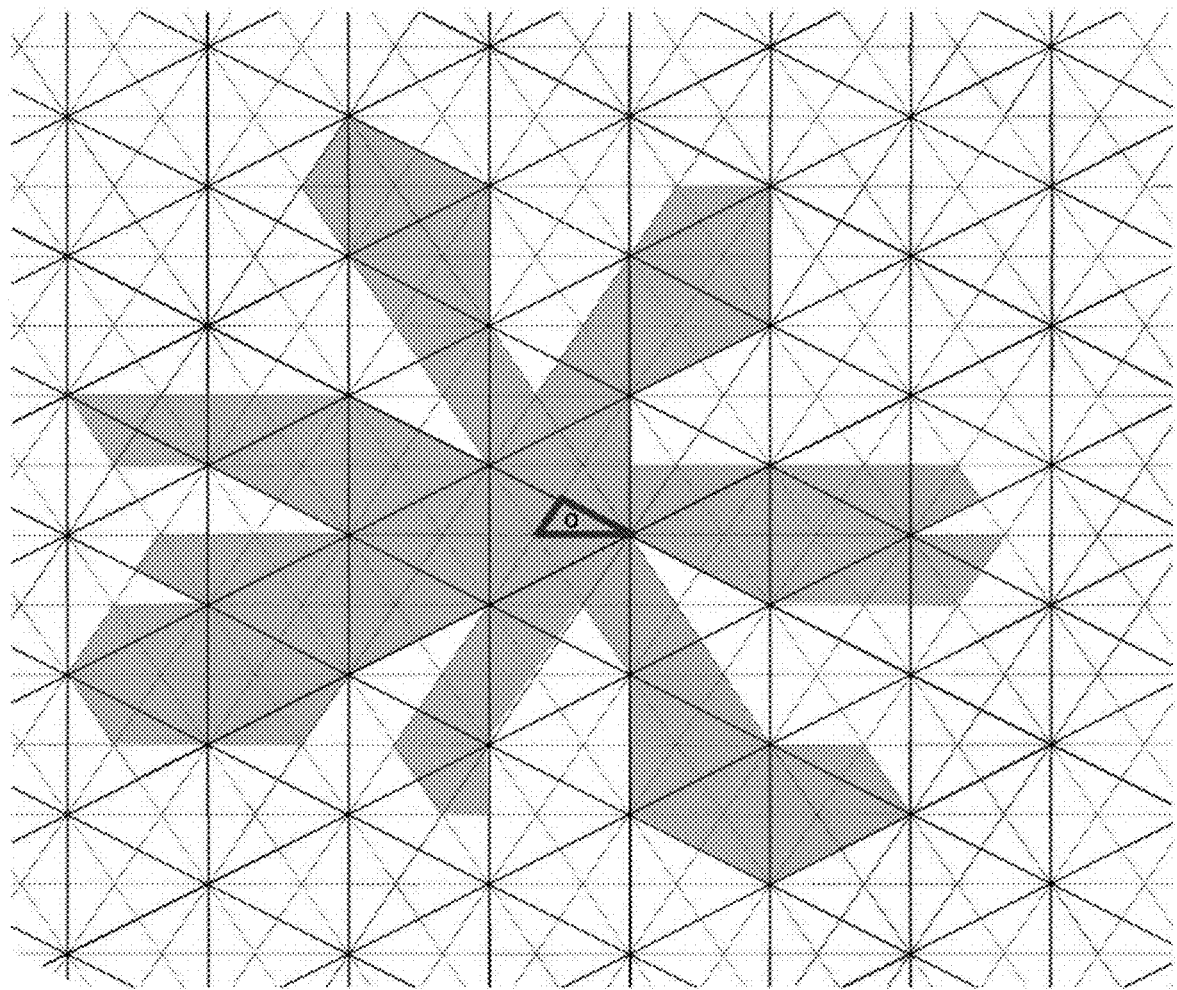
Figures 3, 7C:
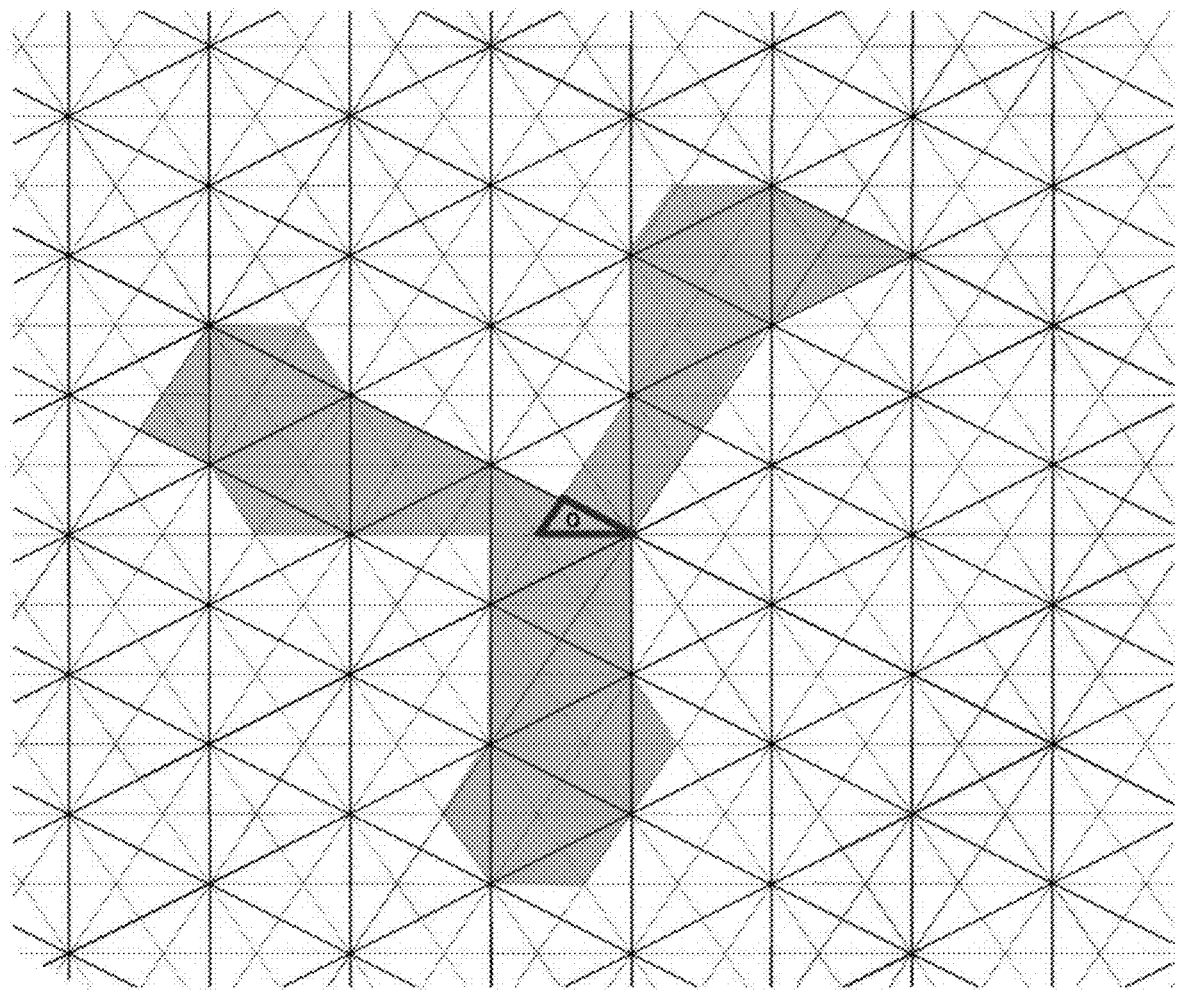
Figures 4, 7C:
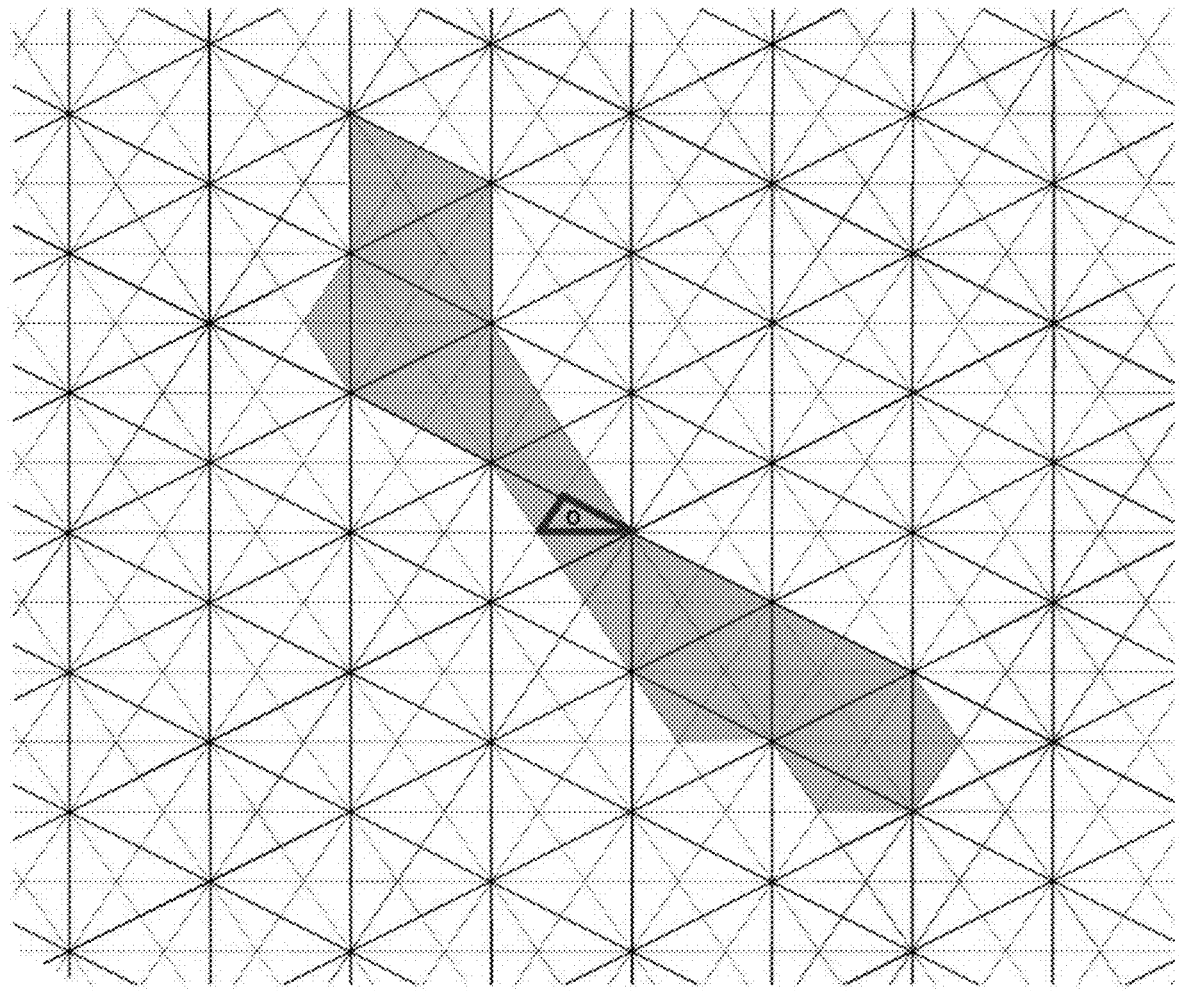
Figure 7D:
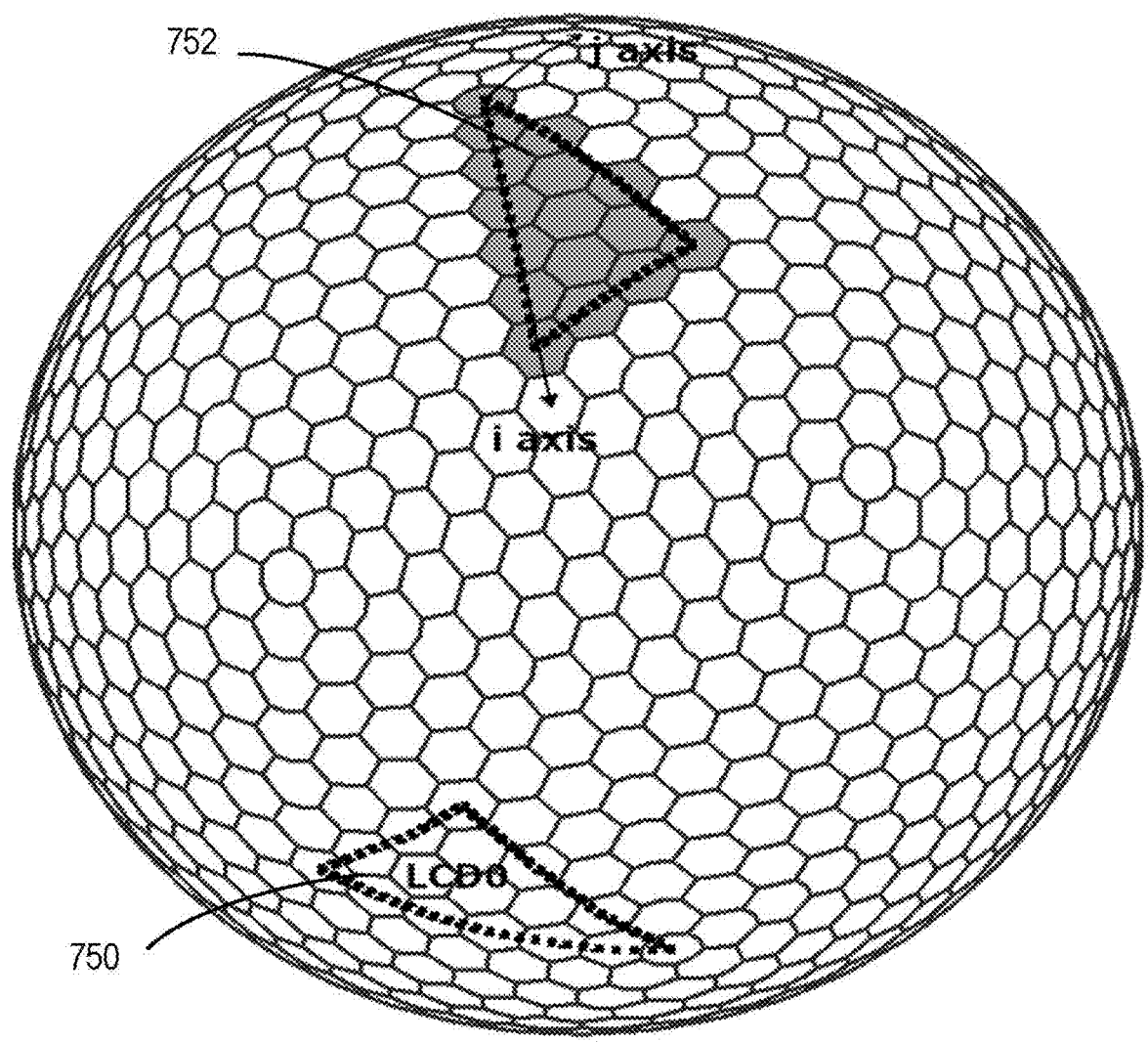
FIG. 7D illustrates representative LCD triangles on a spherical surface.
Figure 7E:
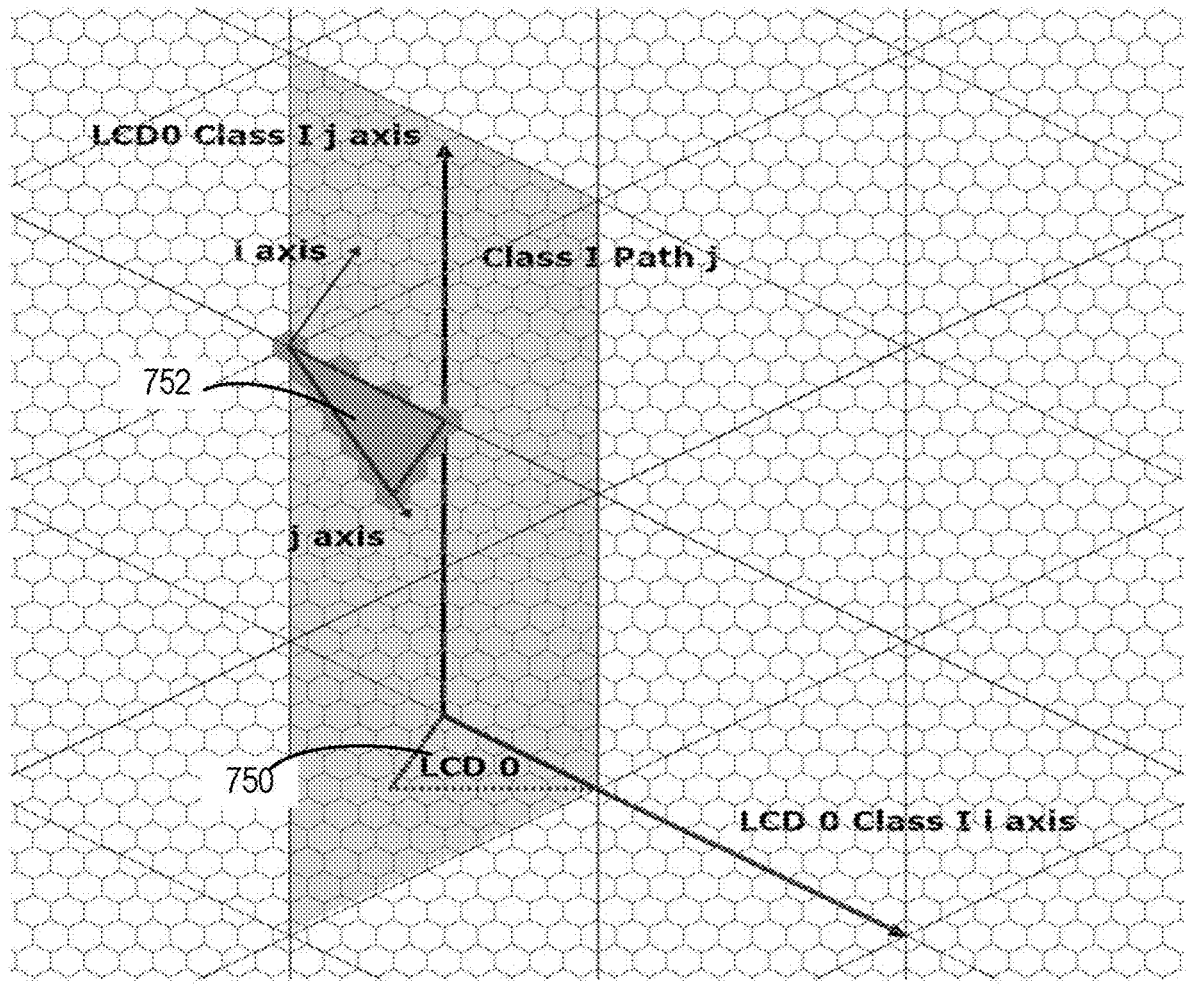
FIG. 7E illustrates a planar embedding of the LCD triangles of FIG. 7D with a division into hexagonal cells.

FIG. 7A illustrates complete great circle paths embedding 700 of Type I and II GC paths defined by LCD triangle 0 shown as triangle 702. The Type I embedding includes path portions 711-713; the Type II embedding includes path portions 721-723. Triangular areas such as area 720 correspond to areas on an opposite side of a sphere with respect to LCD triangle 702. A point indicated with a heavy black dot such as point 721 is a common location that is in all path regions on the opposite side of the related spherical surface. Relative orientations of the triangular areas are indicated with letters A, B, C; as noted above, some portions of these triangular areas are not associated with all Type I or Type II paths. FIG. 7B illustrates the Type I/Type II embedding of FIG. 7A along with hexagonal cells. These cells have a Class II orientation (as defined in FIG. 2B), though they could have any orientation. FIGS. 7C1-7C4 illustrate combined Type III GC paths defined by LCD triangle 0 or LCD triangle 1. FIG. 7D illustrates representative LCD triangles 750, 752 on a spherical surface; FIG. 7E illustrates embeddings of these triangles in a planar surface with hexagonal cells in Class I orientations.

Figure 8:
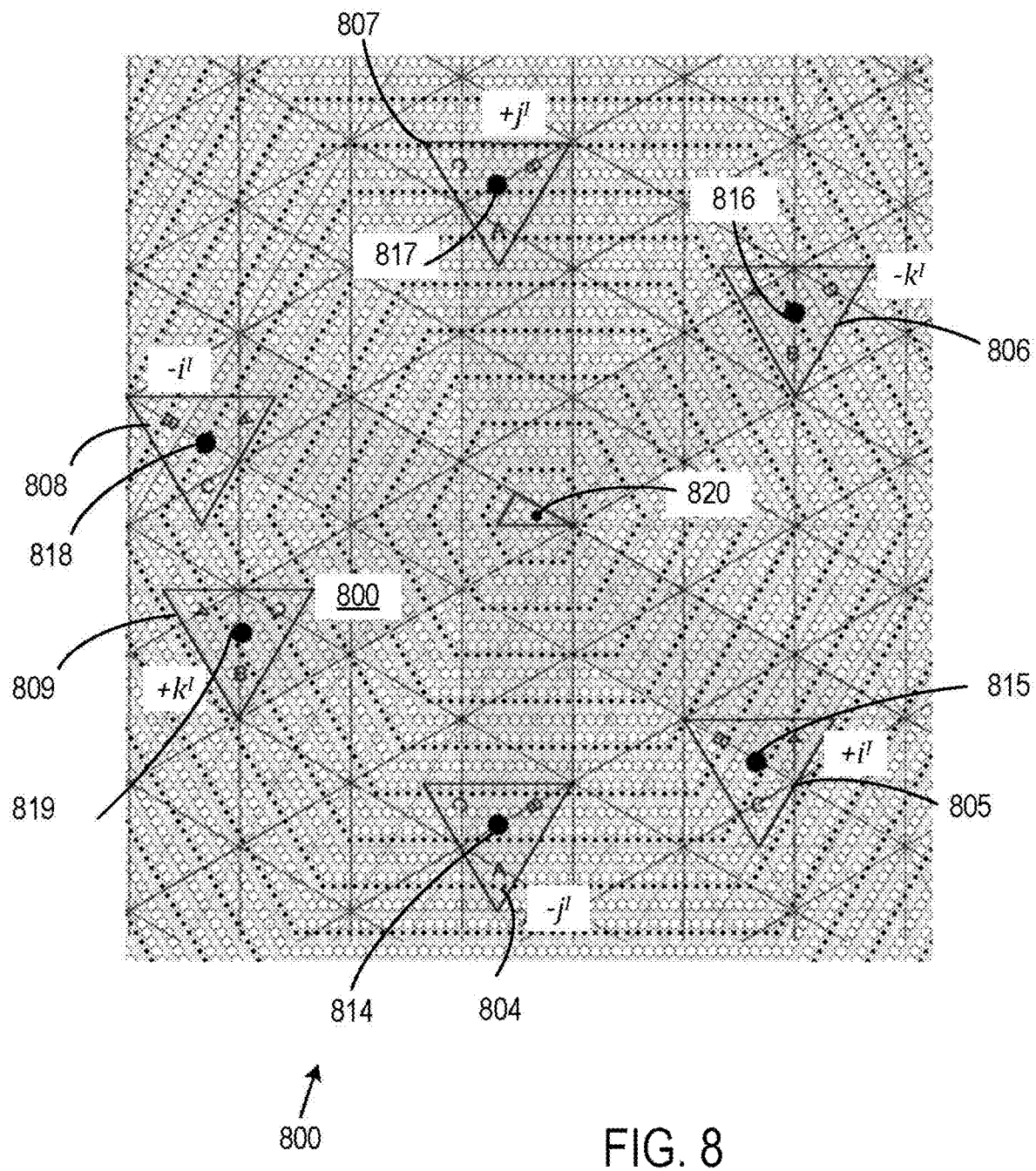
FIG. 8 illustrates a Type I GC embedding with a superimposed Class II hexagonal grid.

FIG. 8 illustrates a Type I GC path embedding 800 defined by LCD triangle 0 overlaid on a Class II hexagonal grid. Triangular overlapping regions 804-809 are situated at a perimeter of the embedding along each of the ±i, j, k coordinate directions, some portions of which are not along paths defined by the embedding. Orientations of the triangular overlapping regions 804-809 are indicated with reference to labels A, B, C that are associated with vertices of the triangles. For each of the overlapping triangular regions 804, 807 (along ±j Type I paths) and 805, 808 (along ±i Type I paths), cells at an A-vertex are on the ±i, ±j Type I paths, respectively. Cells at A-vertices associated with the triangular region 806, 809 are outside of the ±k Type I paths. The cell at the A-vertex of the overlapping triangular region 807 along the +j path is close to a central hexagonal cell 820. A common point is indicated at different cells 814-819 in the embedding 800 with a heavy dot. The shortest Class I distance from the central hexagonal cell 820 in LCD 0 can be determined as a minimum of the distances to the different cells 814-819. In this example, cell 814 is associated with a minimum Type I distance. However, there could be shorter Type II distances.

Figure 9:
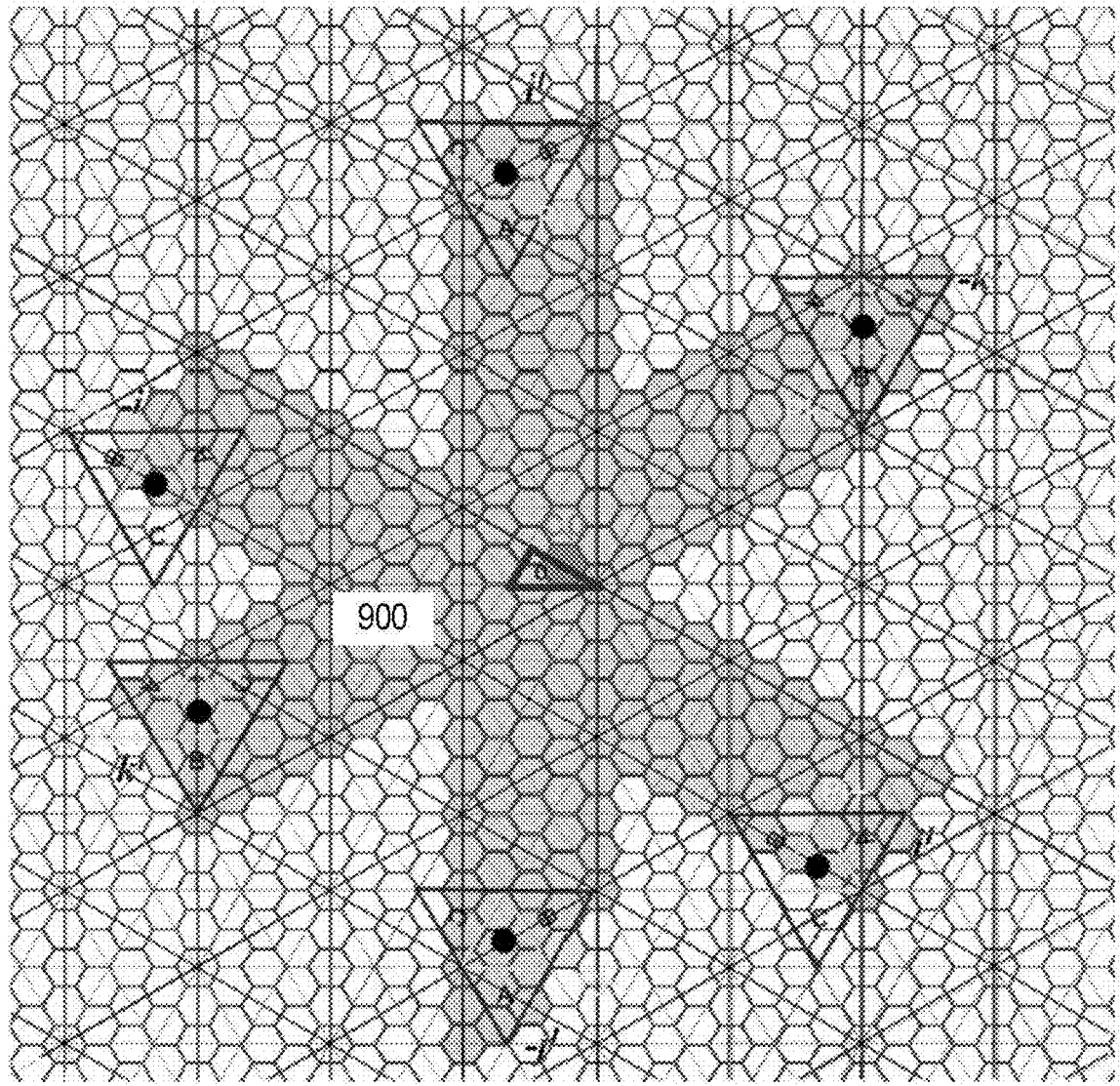
FIG. 9 illustrates a Type I GC embedding with a superimposed Class I hexagonal grid having a different cell area than that of FIG. 8.

FIG. 9 illustrates a complete planar embedding 900 of Type I GC paths such as illustrated in FIG. 8, but with Class I hexagonal cells. In this example, the hexagonal cells are larger than those of FIG. 8, but cells and hierarchies of cells of progressively smaller areas can be defined.

FIGS. 10A-10C illustrates a triangular planar grid for embedding corresponding icosahedral faces, LCD triangles, and LCD sub-triangles. For example, FIG. 10A illustrates a triangular planar grid 1000 that includes triangles such as representative triangle 1002 that correspond to icosahedral faces. (As shown previously, in any specific embedding of the icosahedral faces on to the plane not all of the triangles of FIG. 10A will correspond to icosahedral faces.) FIG. 10B illustrates a further divided triangular grid 1020 that includes the triangle 1002 divided into LCD triangles such as LCD triangle 1022. Other triangles can be similarly divided, and only selected LCD triangles are numbered to avoid complicating the drawings. FIG. 10C illustrates a further divided triangular grid 1040 that includes the triangle 1002 and the LCD triangle 1022 showing further divisions into subtriangles.

Figure 11A:
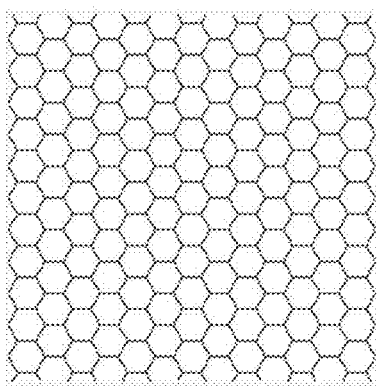
FIGS. 11A-11C illustrate three planar hexagonal grids which are resolutions 1-3 of an aperture sequence 434.
Figure 11B:
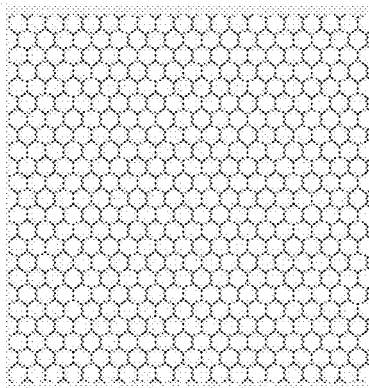
Figure 11C:
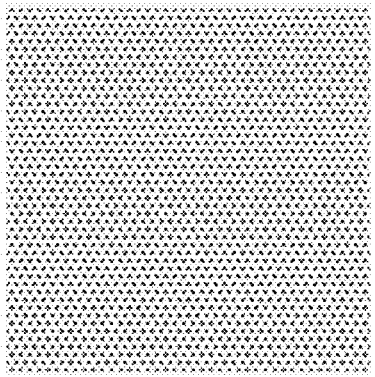
Figure 11D:
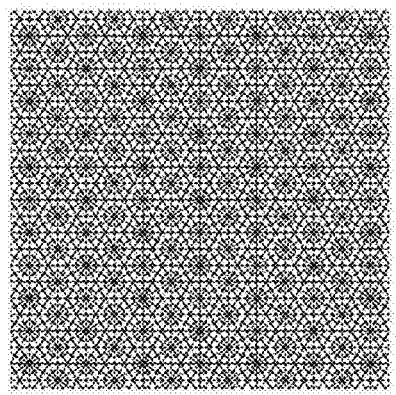
FIG. 11D is a superposition of the planar grids of FIGS. 10C and 11C.

FIGS. 11A-11C illustrate three planar hexagonal grids which are resolutions 1, 2, and 3 of an aperture sequence 434. FIGS. 11A-11B show cell/raster grids and FIG. 11C shows a vector/point grid formed by the center points of a resolution 3 hexagon grid. FIG. 11D is a superposition of the planar grids of FIGS. 11A-11C. As used herein, for grids/cells defined by regular planar polygons on a surface, an aperture of a grid is a ratio of the area of a planar polygon cell at resolution k to the area of the planar polygon cell at resolution k+1. Thus, a 434 aperture sequence corresponds to grid/cell sizes that decrease in area by factors of ¼, ⅓ and ¼. Grids such as these can be associated with Type I, II, or III paths defined by GCs.

Figure 12A:
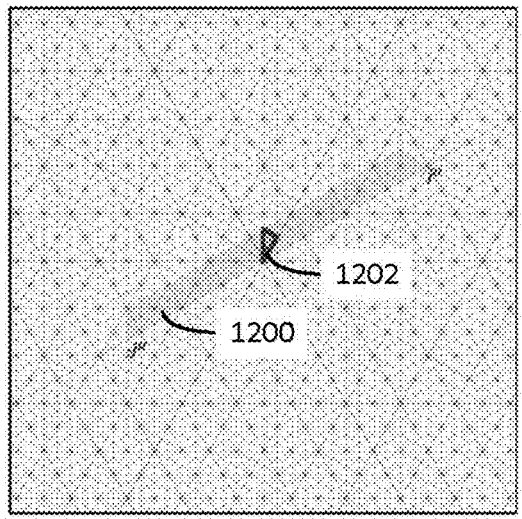
FIGS. 12A-12D illustrate four embeddings of Class II path j for various resolutions of an arbitrary DGGS such as an icosahedral hexagonal DGGS with aperture sequence 434.
Figure 12B:
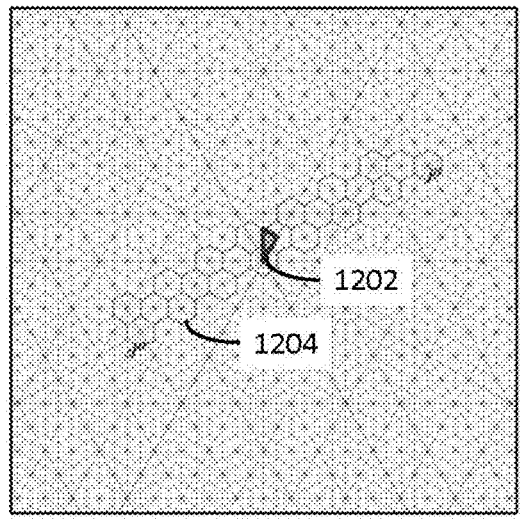
Figure 12C:
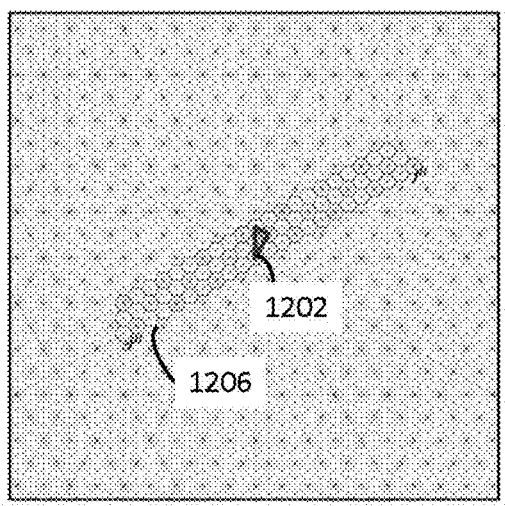
Figure 12D:
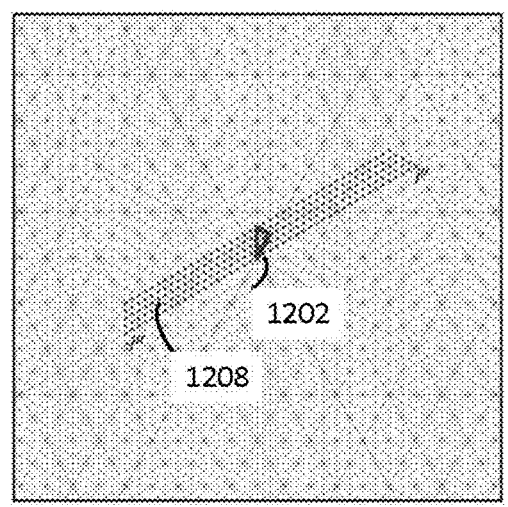

FIGS. 12A-12D illustrate embeddings of a Type II path j for various discrete global grids (DGGs). FIG. 12A illustrates an LCD sub-triangle 1202 situated in a path j 1200, FIG. 12B illustrates a resolution 1 raster that includes hexagonal cells such as cell 1204, FIG. 12C illustrates a resolution 2 raster that includes hexagonal cells as cell 1206, and FIG. 12D illustrates a resolution 3 vector grid that identifies location such as representative location 1208.

Figure 13:
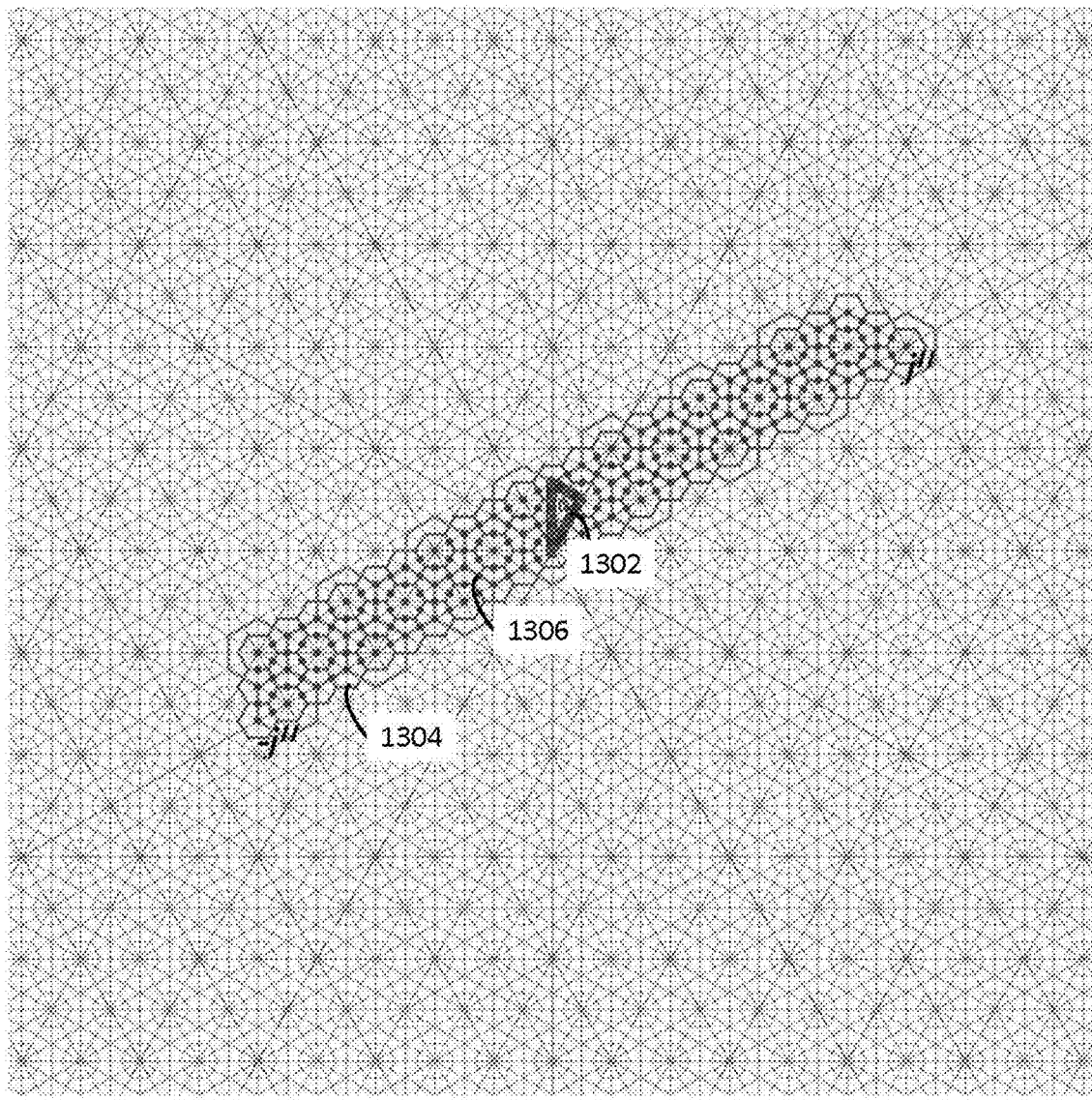
FIG. 13 illustrates a consistent planar embedding of a complete Class II j-path for DGGS resolutions 1-3.

FIG. 13 illustrates a consistent planar embedding of a complete Type II j-path 1304 that includes cells such as representative cell 1306 and LCD triangle 0 1302 for resolutions 1-3 of a DGGS with aperture sequence 434.

Representative Applications

Figure 14:
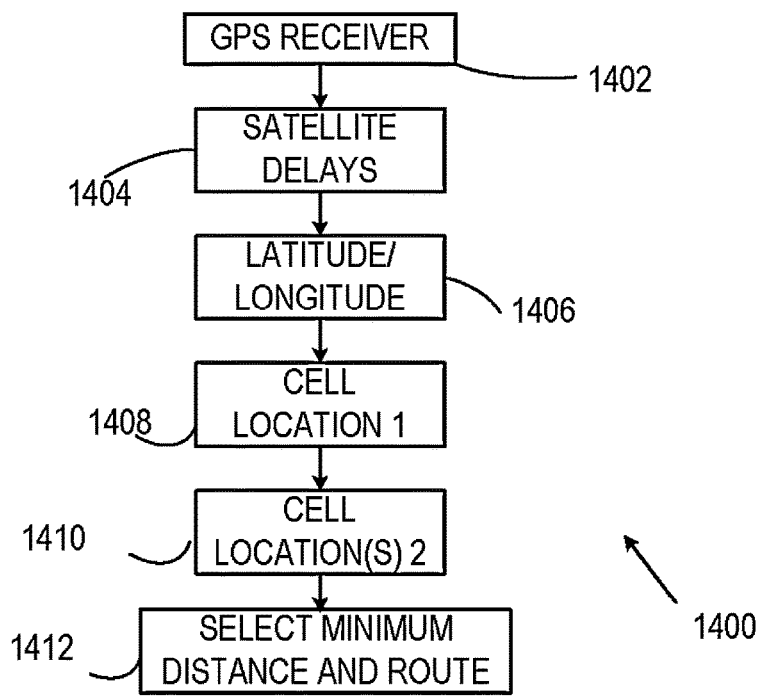
FIG. 14 illustrates a representative GPS-based method for determining a route and a distance using an embedding as disclosed herein.

Embeddings such as those shown above can be used in a variety of applications. With reference to FIG. 14, a representative method 1400 includes detecting GPS signals with a GPS receiver at 1402 and at 1404, delays associated with each of the GPS signals are determined. At 1406, a current latitude and longitude can be determined based on the delays, and at 1408, a first location corresponding to the determined longitude and latitude is associated with a cell of a planar embedding. At 1410, one (or more) cells associated with a destination location is identified, and at 1412, a distance between the first location and the destination location is determined. In some examples, the destination location is associated with a plurality of planar cells and a minimum of distances between the cell associated with the first cell and the plurality of destination cells is selected as the distance. In this example, signal detection and conversion of signal delays required by GPS uses floating point calculations, but other calculations can be performed using integers.

Figure 15:
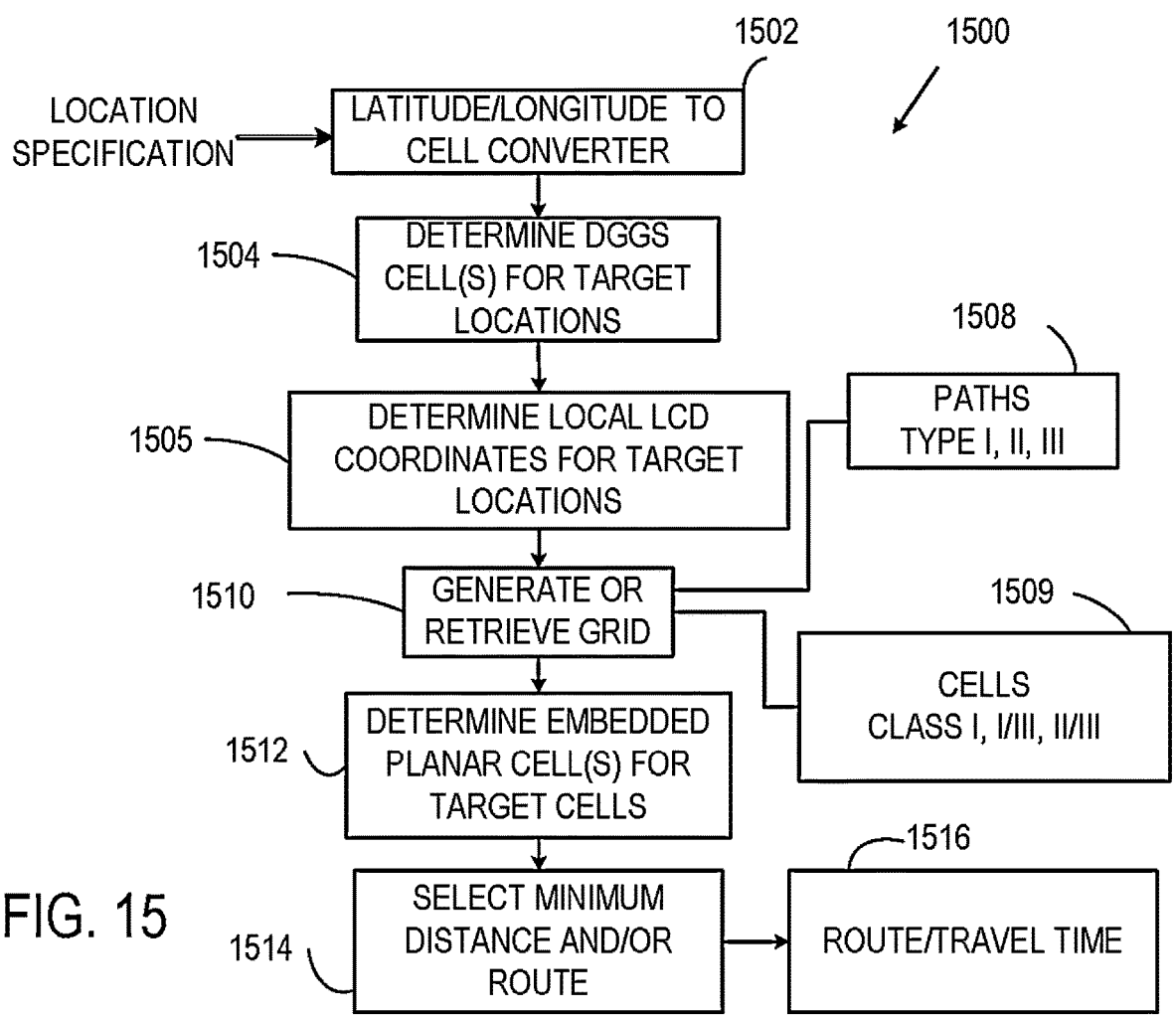
FIG. 15 illustrates another representative method for determining routes and distances based on input latitudes and longitudes.

Referring to FIG. 15, a representative location method 1500 includes receiving a location specification such as latitude and longitude at 1502, and determining DGGS cells for target locations at 1504. At 1505, local LCD coordinates for target locations are determined. At 1510, a suitable grid is generated using computer executable instructions or is retrieved from one or more memories or other computer readable storage devices 1508, 1509 or retrieved from a wide area network. As shown in FIG. 15, a memory 1508 is associated with paths and a memory 1509 is associated with cell definitions, but other arrangements can be used. At 1512, target locations and associated cells are identified from an embedding. At 1514, a minimum distance to a target and/or a route is selected, and at 1516, a travel time is determined. In some cases, a route and travel time (or multiple alternative routes and travel times) are displayed along with a map portion corresponding to the route.

Figure 16:
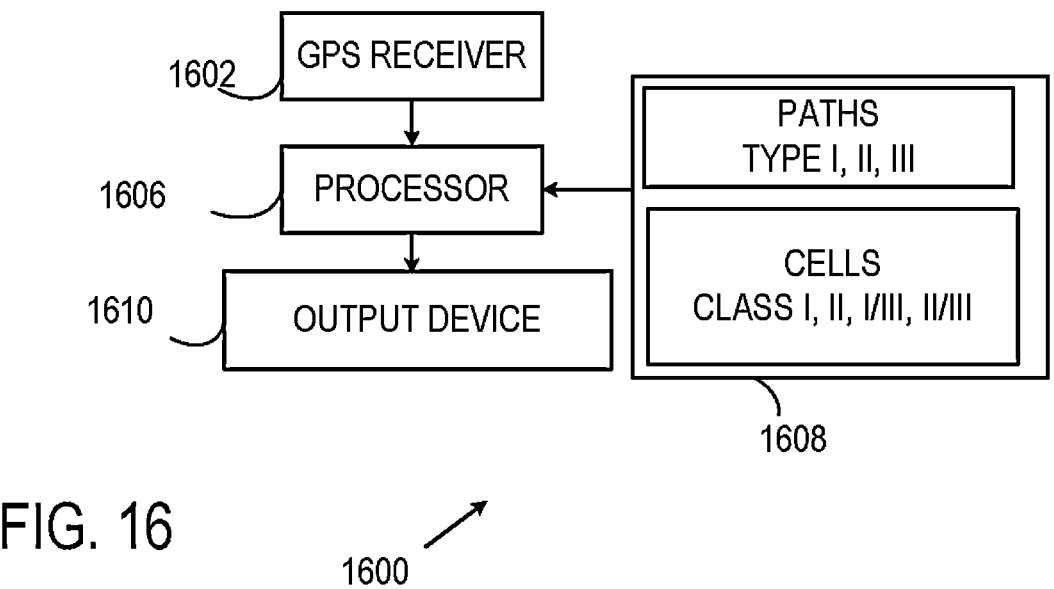
FIG. 16 illustrates a representative navigation system.

FIG. 16 illustrates a representative navigation system 1600 that includes a GPS receiver 1602 that is coupled to a processor 1604 that is configured to determine locations, routes, and travel times. One or more non-transitory computer readable media 1606 store one or more embeddings and associated cell arrangements and processor-executable instructions for determining distances and routes. In the example of FIG. 16, initial locations are based on GPS data, but in other examples, initial locations can be specified with paths/cells as discussed above, and only integer processing is needed.

Figure 17:
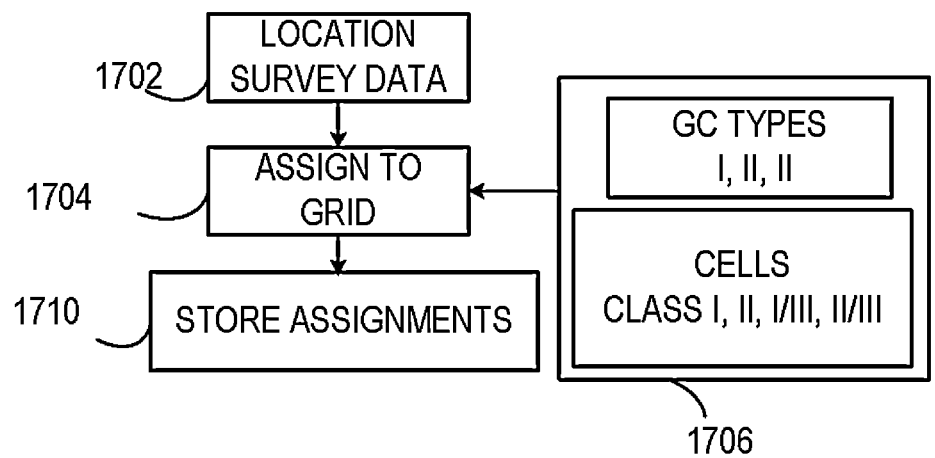
FIG. 17 illustrates a representative method of arranging location-based information in a database.

As shown in FIG. 17, a representative database method 1700 includes receiving or generating location-based data at 1702. Such data can concern crop coverage, terrain type, population or population density associated with geographical locations, or image or other data associated with any spatial distribution such as an image. At 1704, data values are assigned to grid locations, and at 1710, the data values and grid locations are stored in one or more non-transitory computer-readable media. Path types based on GC types and cell specifications based on cell classes (or processor executable instructions for generating paths and cells) are stored and can be retrieved from one or more non-transitory computer-readable media 1706. In some examples, path and cell specifications are fixed, and multiple path types and cell classes need not be stored. With such methods and related databases, data queries can be based on locations on a planar embedding (specified by coordinates in an embedding) or based on locations on a spherical surface which are referenced to an embedding.

Metric distance between any two cells in an embedding is generally obtained as a minimum of two-dimensional metric distances associated with all planar unfoldings of the underlying icosahedron along all appropriate great circles of symmetry, as determined by the orientation Class of the hexagonal grid. For example, to find a distance between any two cells, an icosahedral grid is arranged on a plane by unfolding the icosahedron in an appropriate GC path found by, for example, a look-up table of the LCD triangles on which the two cells lie. The metric distance is then calculated. Note that any two of the 20 icosahedral faces are pairwise-connected by at least one of the bands of a GC grid.

Figure 18:
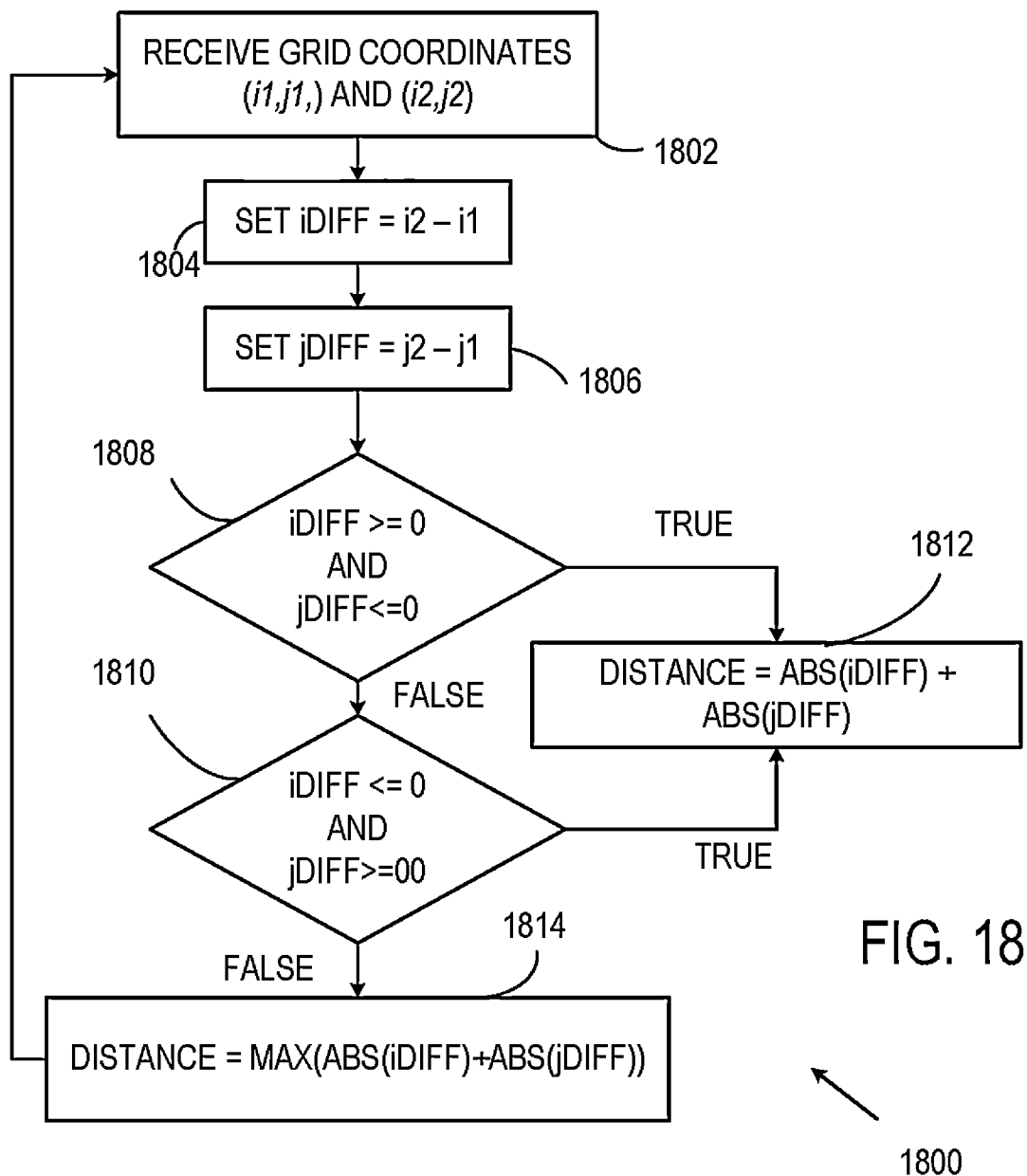
FIG. 18 illustrates a method of determining distances using cells embedded in a planar hexagonal grid and indexed using two-dimensional integer hexagon coordinates as disclosed herein.

A representative method 1800 of determining a metric distance based on an embedding is illustrated in FIG. 18. At 1802, grid locations such as specified by grid coordinates (i1, j1) and (i2, j2) are received for a first location and a second location, respectively. At 1804, a difference between i-coordinates iDIFF is assigned a value i2−i1 and a difference between j-coordinates jDIFF is assigned a value j2−j1. If iDIFF and jDIFF have opposite signs, then at 1808 or 1810, a corresponding absolute value is determined, and distance is obtained as a sum of iDIFF and jDIFF at 1812. Otherwise, a distance is determined at 1814 as a maximum of absolute values of iDIFF and jDIFF.

Figure 19:
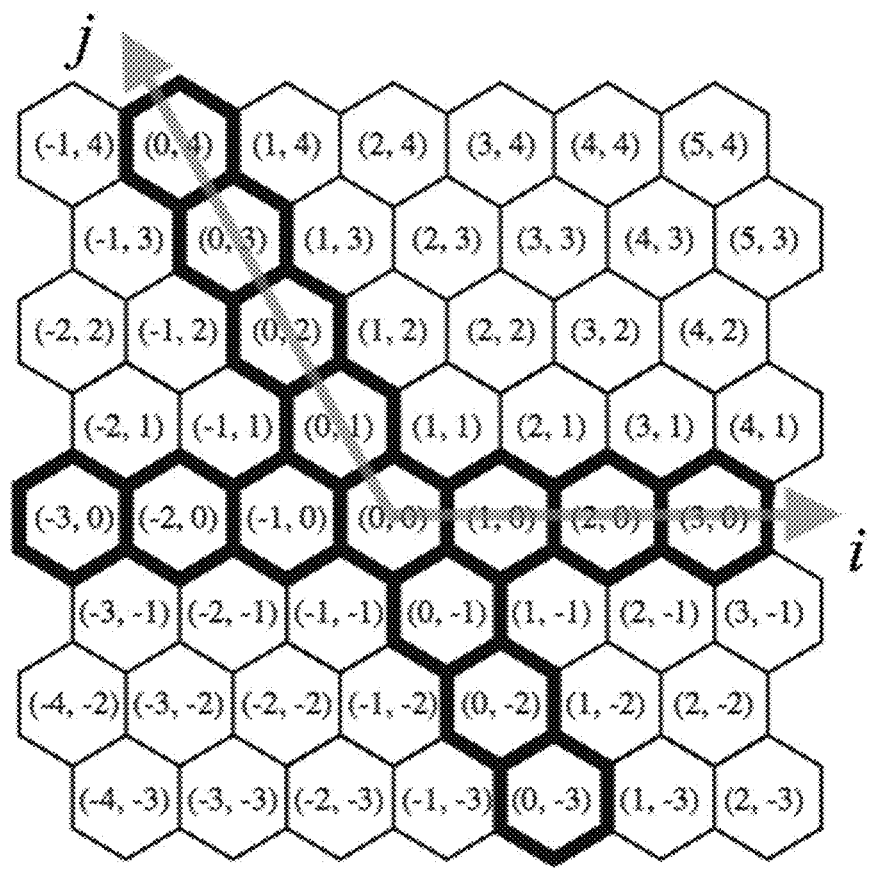
FIG. 19 illustrates planar two-dimensional integer hexagon coordinates associated with a representative distance calculation.

FIG. 19 illustrates a portion of a representative planar hexagonal grid 1900 in which i, j coordinates for each hexagonal cell are indicated. The hexagonal grid 1900 is a Class I grid, though a similar two-dimensional hexagon coordinate system can be applied to any orientation, and the grid can include multiple series of coarser or finer hexagons.

Figure 21A:
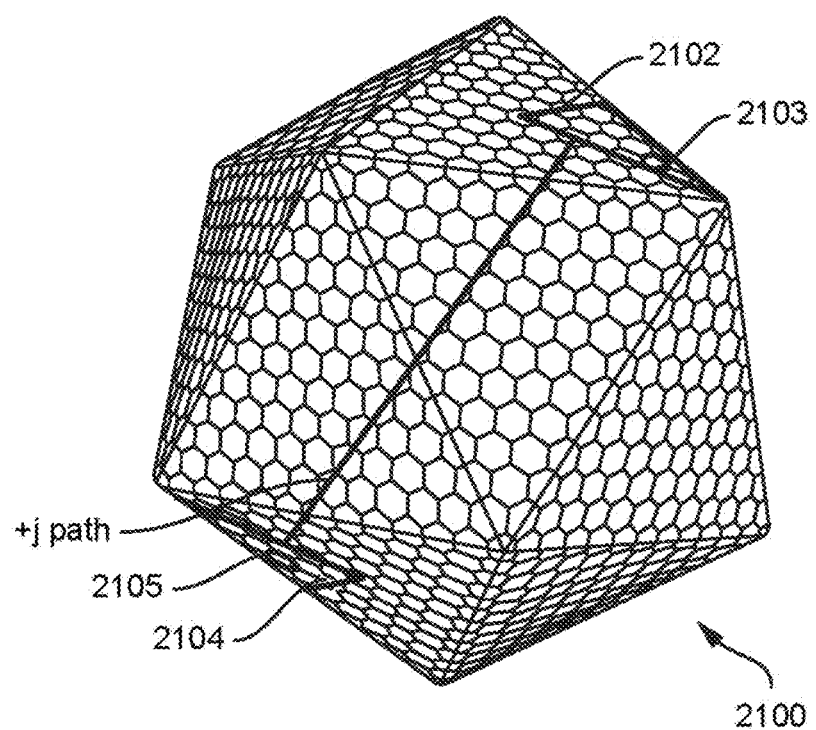
FIG. 21A illustrates two LCD triangles defined on an icosahedron.
Figure 21B:
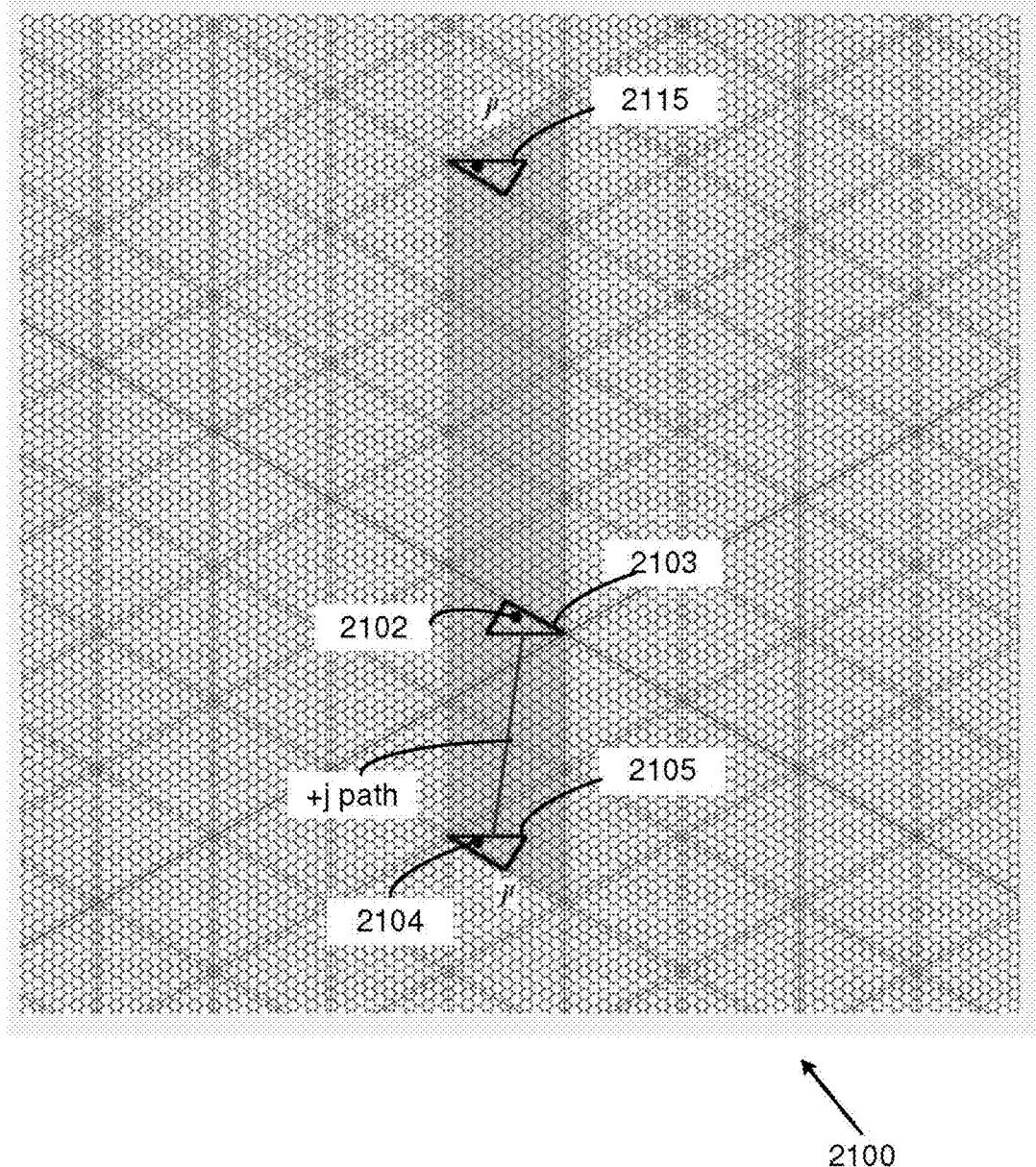
FIG. 21B illustrates two LCD triangles embedded in a Type I path on the plane.

FIG. 21A illustrates LCD triangles 2102, 2104 situated on an icosahedron 2100. LCD triangles 2102, 2104 lie in a Type I path region. When embedded in a Type I path region on the plane, as illustrated in FIG. 21B, LCD triangle 2104 is positioned as LCD0 and LCD triangle 2102 has embeddings along a +jI path and a −jI path. In FIG. 21A, a general orientation of one of these paths (a+j path) is shown; the other path is on a back side of the icosahedron 2100. Each of the LCD triangles 2102, 2104 is associated with a respective cell (location) 2103, 2105 on a Class I hexagonal grid. FIG. 21B illustrates the embedding of LCD triangles 2102, 2104 and the associated cell locations 2103, 2105 on a plane. LCD triangle 2115 corresponds to LCD triangle 2105, illustrating that multiple embedded locations can be used.

Figure 20:
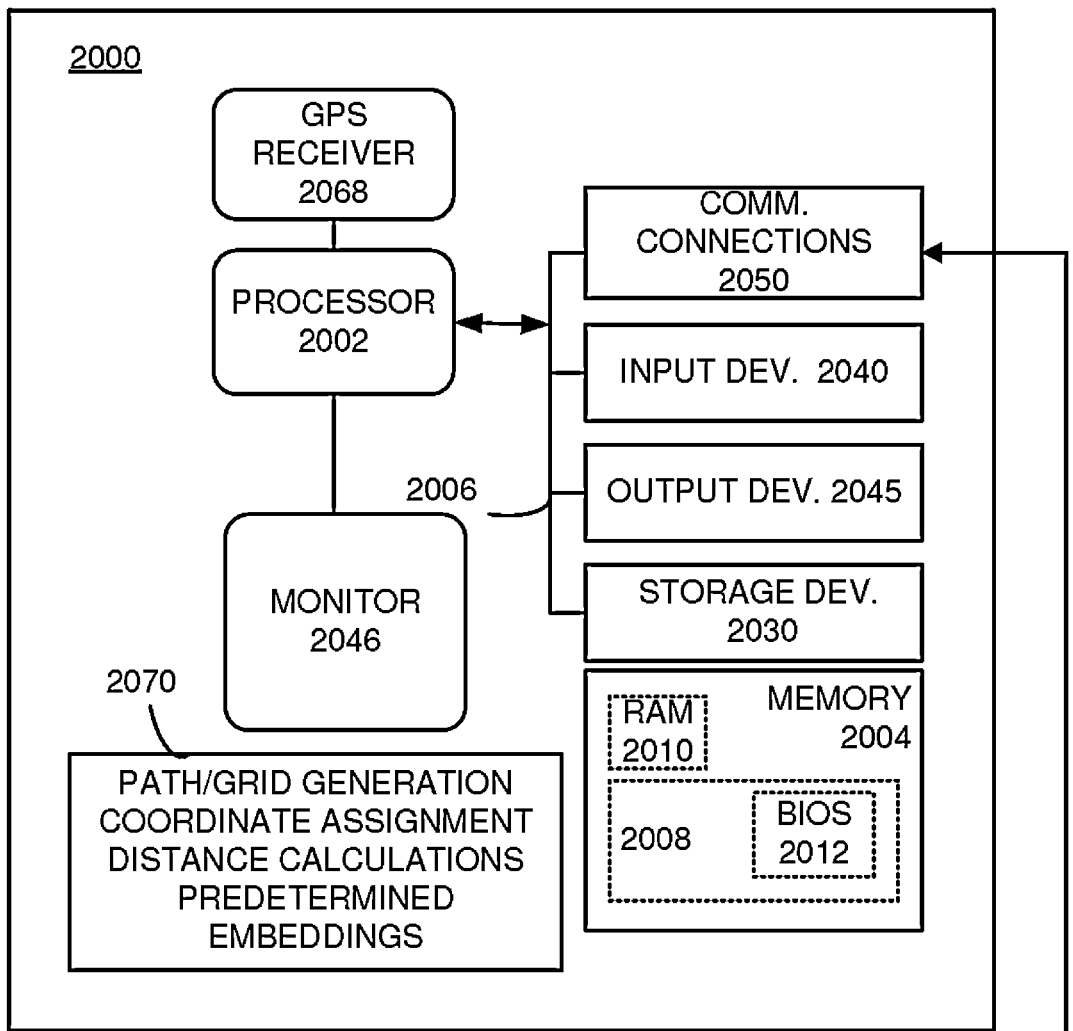
FIG. 20 illustrates a representative computing environment.

FIG. 20 and the following discussion are intended to provide a brief, general description of an exemplary computing environment in which the disclosed technology may be implemented. Such technology or portions thereof are generally including in positioning and navigation systems as well as other systems using location-based data. Although not required, the disclosed technology is described in the general context of computer executable instructions, such as program modules, being executed by one or more processors. Generally, program modules include routines, programs, objects, components, data structures, etc., that perform particular tasks or implement particular abstract data types. Moreover, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 20, an exemplary system for implementing the disclosed technology includes a general purpose computing device in the form of an exemplary conventional PC 2000, including one or more processing units 2002, a system memory 2004, and a system bus 2006 that couples various system components including the system memory 2004 to the one or more processing units 2002. The system bus 2006 may be any of several types of bus structures including a memory bus or memory controller, a peripheral bus, and a local bus using any of a variety of bus architectures. The exemplary system memory 2004 includes read only memory (ROM) 2008 and random access memory (RAM) 2010. A basic input/output system (BIOS) 2012, containing the basic routines that help with the transfer of information between elements within the PC 2000, is stored in ROM 2008.

The exemplary PC 2000 further includes one or more storage devices 2030 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 2006 by a hard disk drive interface, a magnetic disk drive interface, and an optical drive interface, respectively. The drives and their associated computer readable media provide nonvolatile storage of computer-readable instructions, data structures, program modules, and other data for the PC 2000. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 2030 including an operating system, one or more application programs, other program modules, and program data. A user may enter commands and information into the PC 2000 through one or more input devices 2040 such as a keyboard and a pointing device such as a mouse. Other input devices may include a digital camera, microphone, joystick, game pad, satellite dish, scanner, or the like. These and other input devices are often connected to the one or more processing units 2002 through a serial port interface that is coupled to the system bus 2006, but may be connected by other interfaces such as a parallel port, game port, or universal serial bus (USB). A monitor 2046 or other type of display device is also connected to the system bus 2006 via an interface, such as a video adapter. Other peripheral output devices, such as speakers and printers (not shown), may be included.

The PC 2000 may operate in a networked environment using logical connections to one or more remote computers, such as a remote computer 2060. In some examples, one or more network or communication connections 2050 are included. The remote computer 2060 may be another PC, a server, a router, a network PC, or a peer device or other common network node, and typically includes many or all of the elements described above relative to the PC 2000, although only a memory storage device 2062 has been illustrated in FIG. 20. The personal computer 2000 and/or the remote computer 2060 can be connected to a logical a local area network (LAN) and a wide area network (WAN). Such networking environments are commonplace in offices, enterprise wide computer networks, intranets, and the Internet.

When used in a LAN networking environment, the PC 2000 is connected to the LAN through a network interface. When used in a WAN networking environment, the PC 2000 typically includes a modem or other means for establishing communications over the WAN, such as the Internet. In a networked environment, program modules depicted relative to the personal computer 2000, or portions thereof, may be stored in the remote memory storage device or other locations on the LAN or WAN. The network connections shown are exemplary, and other means of establishing a communications link between the computers may be used.

Computer-executable instructions for generating grids, assigning locations, and obtaining distances can be stored in non-transitory memory 2070 or stored remotely. Typically, a GPS receiver 2068 is coupled to the processor, but can be situated remotely as well.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc. Such components may be especially useful for low cost, mobile devices.

Volume Representations

Figure 22:
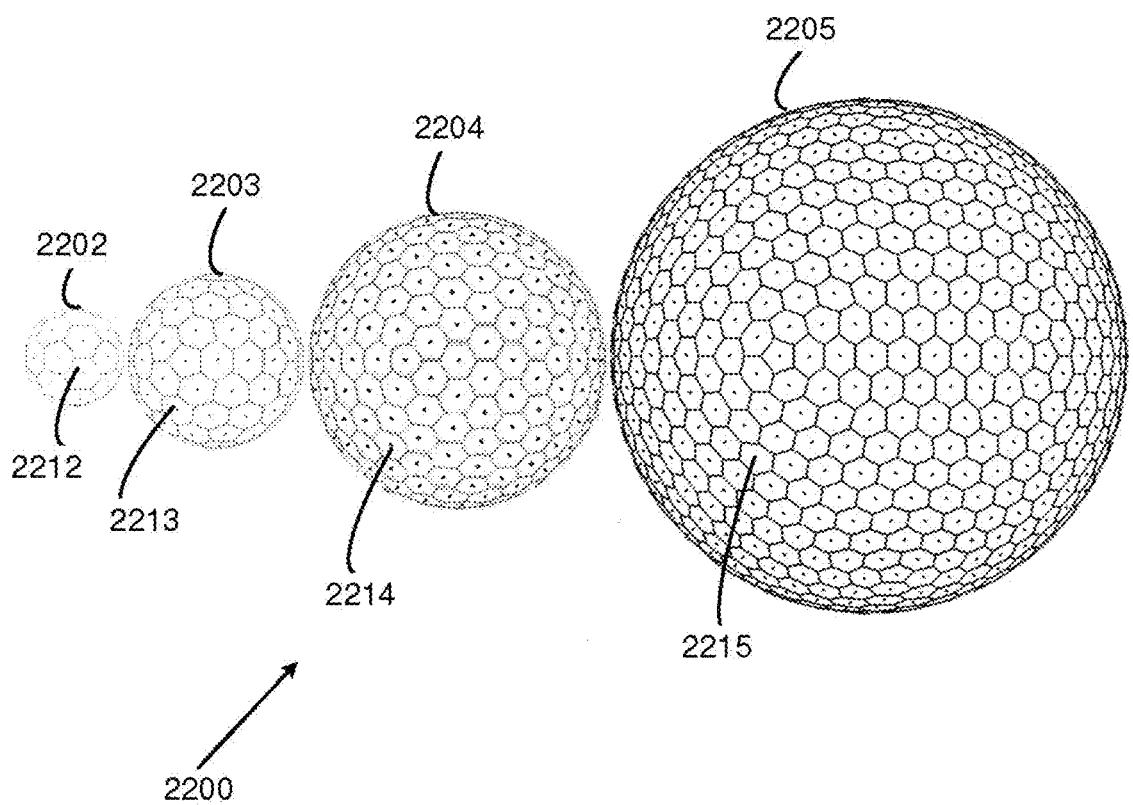
FIG. 22 illustrates a series of spherical shells of different sizes that could be used to define locations in three dimensions. Each spherical shell has a single resolution discrete global grid defined on it.

Locations of objects above or below the surface of the earth, such as orbiting satellites or oil deposits, are typically established using a latitude, longitude, and altitude (depth/height). Computer processing using latitude/longitude/altitude positional systems require floating point (real number) arithmetic, and are more processor-intensive than computations involving integer values to which processors are well-suited. In addition, establishing, updating, and querying databases that include location dependent information is complicated by the presence of real numbers, and arrangements of geophysical and other location-dependent data can require additional processor power simply to provide floating point number processing. Referring to FIG. 22, three-dimensional locations can be specified based on a series 2200 of spherical shells 2202-2205. In this example, hexagonal cells 2212-2115 specifying location on each of the shells 2202-2205, respectively, have the same area and thus are associated with progressively finer relative location accuracy. Typically, each additional shell is associated with an additional indexing coordinate. Cell area can change from layer to layer, and FIG. 22 illustrates only one example.

Figure 23A:
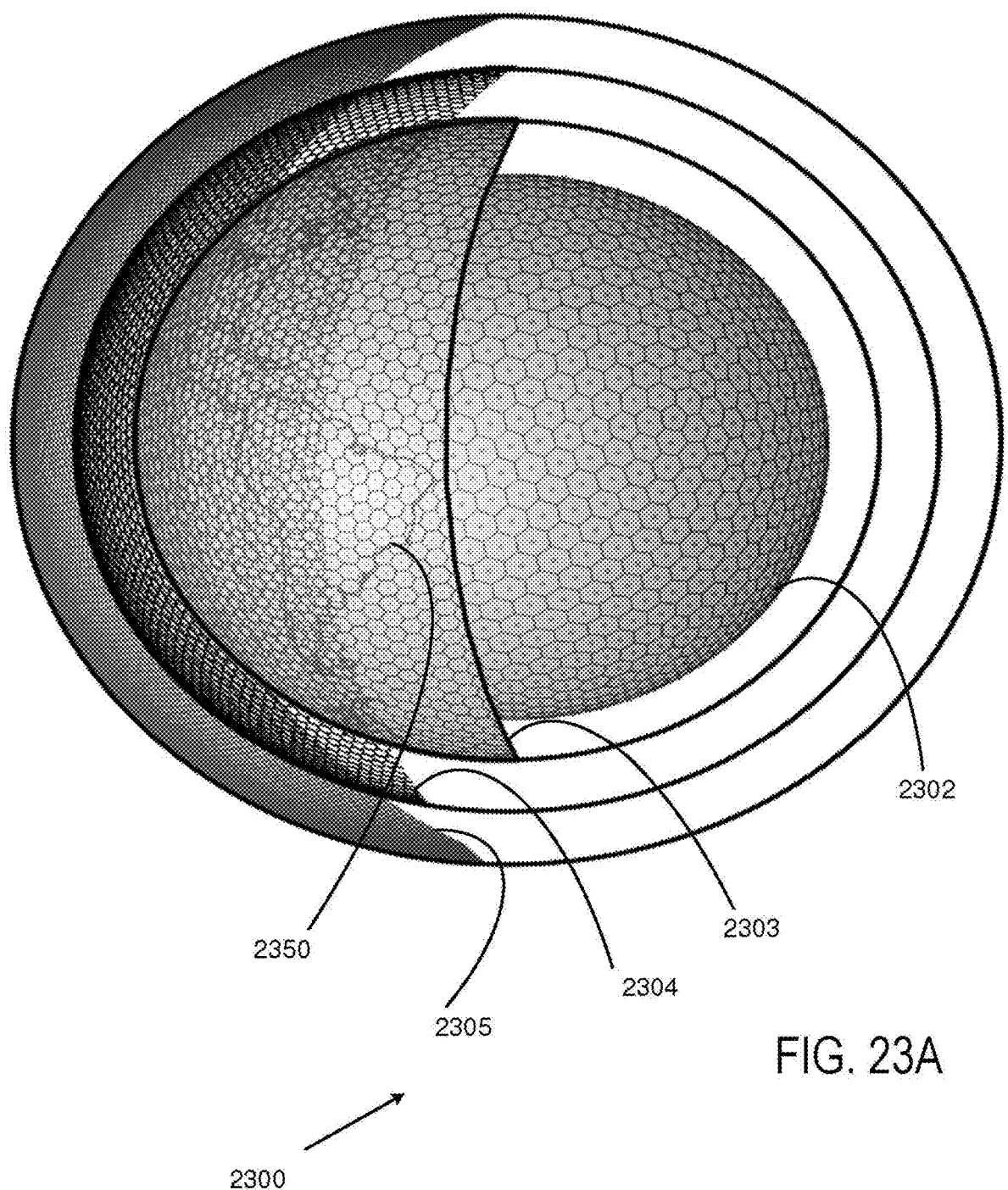
FIG. 23A illustrates individual resolutions of a discrete global grid system on the surfaces of concentric spheres situated below, on, and above the earth's surface.

Referring to FIG. 23A, a series 2300 of concentric shells 2302-23-5 are shown, each divided into hexagonal cells of decreasing area from shell 2302 to shell 2305. The shell 2303 corresponds in this example to a surface of the earth and a continental outline 2350 is shown, but larger or smaller shells can be used, and cell area can vary in any desired manner between shells. Shell 2302 corresponds to a region below the earth's surface, while shells 2304 and 2305 are above the surface of the earth.

Figure 23B:
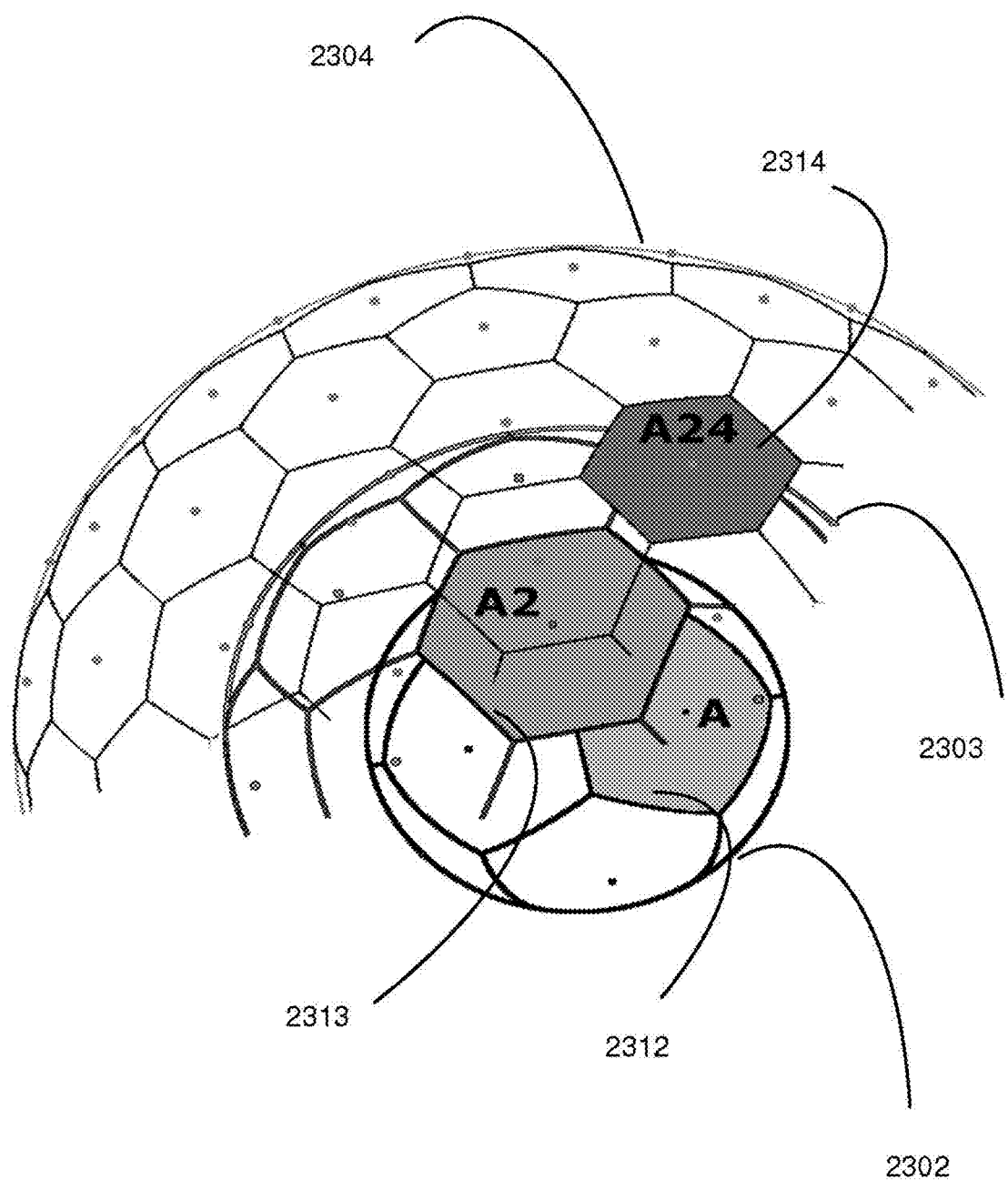
FIG. 23B illustrates applying the DGGS indexing of FIG. 23C to index a cell in the second concentric sphere of a three-dimensional indexing system.
Figure 23C:
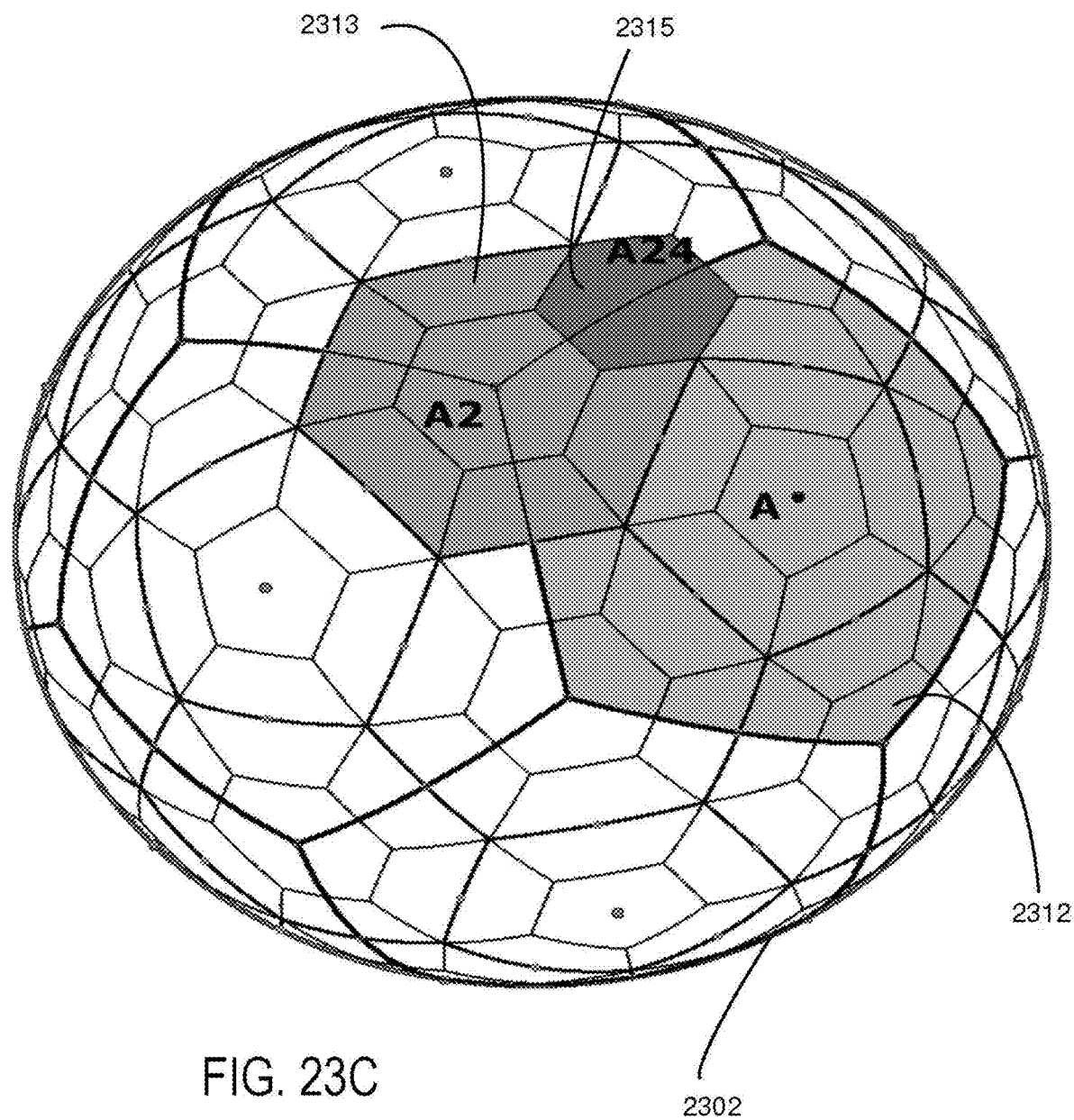
FIG. 23C illustrates an example of indexing a cell in resolution 2 of an aperture sequence 34 discrete global grid system using Central Place Indexing.

FIG. 23C illustrates the indexing of a cell on single-sphere discrete global grid system using a hierarchical integer index. FIG. 23B illustrates using the same indexing system to index a three-dimensional location with reference to shells 2302-2304 with associated cells 2312-2314 that are assigned coordinate indices A, A2, A24, respectively.

In this example, cells can be used to specify areas on respective shells or associated volumes. However, this approach can be applied to any three-dimensional data, so that volumes or volume elements (voxels) can be indexed.

Figure 24A:
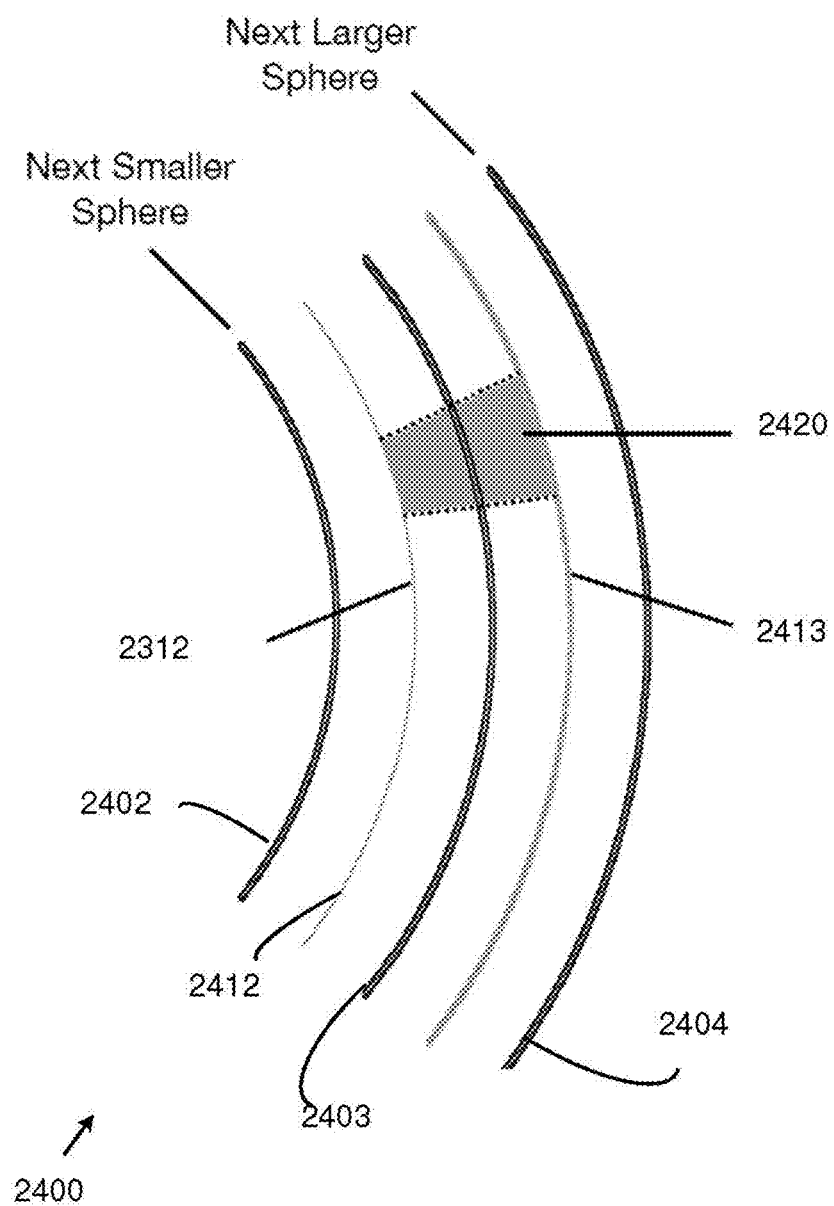
FIG. 24A illustrates one method of creating volumetric cells.
Figure 24B:
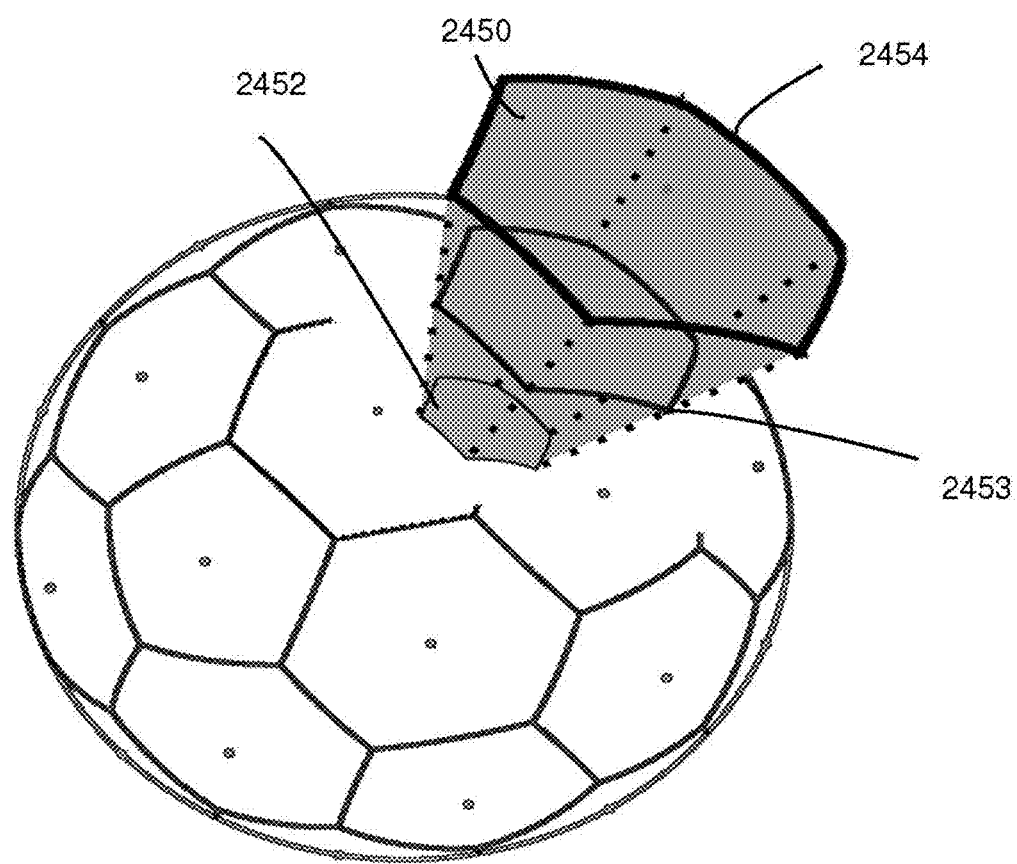
FIG. 24B illustrates the shape of the volumetric cells created by the method of FIG. 24A.

Referring to FIG. 24A, concentric spherical shells 2402-2404 define a volume element 2420. Intermediate shells 2412, 2413 (that need not be used in indexing) that are situated between the shells 2402, 2403 and 2403, 2404, respectively, establish volume boundaries between shells, and in combination with a cell location on the shell 2403, define the volume element 2420. FIG. 24B illustrates a cell 2450 defined in the manner illustrated in FIG. 24A. The cell 2453 lies on a spherical shell, while cells 2452 and 2454 lie on intermediate shells (not pictured) and are the minimum and maximum altitude extents of the volumetric cell.

Additional Examples

It will be recognized that the illustrated embodiments can be modified in arrangement and detail without departing from the principles of the disclosure. For instance, elements of the illustrated embodiment shown in software may be implemented in hardware and vice-versa. In view of the many possible embodiments to which the disclosed principles may be applied, it should be recognized that the illustrated embodiments are examples and should not be taken as a limitation on the scope of the disclosure. For instance, various components of systems and tools described herein may be combined in function and use. I therefore claim as my invention all subject matter that comes within the scope and spirit of the appended claims.

I claim:

1. A method, comprising, with a processor:
defining a plurality of concentric shells and associating each shell with a different precision of a hierarchical discrete grid system;
establishing at least one cell on each of the shells; and
establishing a location by identifying a corresponding cell on at least one of the plurality of concentric shells.

2. The method of claim 1, further comprising assigning an index to the location based on the identified corresponding cell.

3. The method of claim 2, storing a location in a memory or other computer-based storage based on the assigned index.

4. The method of claim 1, wherein the shells are concentric spherical shells, and the cells on each of the shells are hexagonal.

5. The method of claim 4, wherein the cells on each shell have a common area, and cells on different shells have different areas.

6. The method of claim 1, further comprising representing the location as an integer value.

7. The method of claim 1, further comprising storing location-associated data corresponding to the location.

8. The method of claim 1, further comprising selecting an origin and defining the plurality of concentric shells based on the selected origin.

9. The method of claim 1, further comprising defining at least one intermediate shell that establishes a volume boundary between the identified corresponding spherical shell and the intermediate shell.

10. The method of claim 9, wherein the at least one intermediate shell comprises a first intermediate shell and a second intermediate shell, wherein the corresponding concentric shell is situated between the first intermediate shell and the second intermediate shell such that the first intermediate shell and the second intermediate shell define a voxel, and further comprising establish a location index for the defined voxel based on the identified corresponding concentric shell.

11. The method of claim 1, further comprising:
establishing a location by identifying corresponding cells on two or more of the concentric shells; and
assigning an index to the location based on the identified corresponding cells on the two or more concentric shells.

12. A computer-implemented method for processing data defined with respect to an origin point in three-dimensional space, comprising:
with a processor,
establishing a set of concentric spherical shells with the origin point as their origin;
establishing a discrete global grid on each of the concentric spherical shells
choosing a discrete global grid indexing system defined for a discrete global grid system formed by the discrete global grids on the progressively larger or smaller spherical shells; and
assigning a target location in the three-dimensional space to a corresponding index on a selected one of the concentric spherical shells.

13. The computer-implemented method of claim 12, wherein the discrete global grid system is an icosahedral hexagonal system.

14. The computer-implemented method of claim 13, wherein the discrete global grid system indexing is a hierarchical integer indexing.

15. A database system, comprising:
a processor configured to store location data based on the computer-implemented method of claim 14.

16. The database system of claim 15, wherein the processor is configured to store a location associated with each data item is stored as one or more integer values.

17. The method of claim 12, further comprising selecting the origin point.

18. The method of claim 12, further comprising defining at least one intermediate shell that establishes a volume boundary between the selected concentric spherical shell and the intermediate shell.

19. The method of claim 18, wherein the at least one intermediate shell comprises a first intermediate shell and a second intermediate shell, wherein the selected concentric shell is situated between the first intermediate shell and the second intermediate shell such that the first intermediate shell and the second intermediate shell define a voxel, and further comprising establish an index for the defined voxel based on the selected concentric shell.

20. The method of claim 12, further comprising storing location-associated data based on the assigned target locations.

21. A database system, comprising:
a processor configured to store location-associated data based on the assigned target locations obtained by the method of claim 12.

22. A system, comprising:
a processor; and
at least one computer readable medium containing processor-executable instructions for performing a method that includes:
establishing a set of concentric spherical shells about an origin point;
establishing a discrete global grid on each of the concentric spherical shells
choosing a discrete global grid indexing system defined for a discrete global grid system formed by the discrete global grids on progressively larger or smaller spherical shells;
assigning a target location in a three-dimensional space to a corresponding index on a selected one of the concentric spherical shells; and
storing location-associated data based on the assigned target locations.

* * * * *